United States Patent
Tanaka et al.

(10) Patent No.: US 12,399,269 B2
(45) Date of Patent: Aug. 26, 2025

(54) IMAGE ANALYZING DEVICE AND IMAGE ANALYZING METHOD

(71) Applicant: NEC Corporation, Tokyo (JP)

(72) Inventors: Taichi Tanaka, Tokyo (JP); Osamu Hoshuyama, Tokyo (JP)

(73) Assignee: NEC Corporation, Tokyo (JP)

(*) Notice: Subject to any disclaimer, the term of this patent is extended or adjusted under 35 U.S.C. 154(b) by 310 days.

(21) Appl. No.: 17/912,165

(22) PCT Filed: Mar. 24, 2020

(86) PCT No.: PCT/JP2020/013032
§ 371 (c)(1),
(2) Date: Sep. 16, 2022

(87) PCT Pub. No.: WO2021/192038
PCT Pub. Date: Sep. 30, 2021

(65) Prior Publication Data
US 2023/0133736 A1 May 4, 2023

(51) Int. Cl.
G01S 13/90 (2006.01)
G06T 7/00 (2017.01)

(52) U.S. Cl.
CPC ............ *G01S 13/9011* (2013.01); *G06T 7/00* (2013.01)

(58) Field of Classification Search
CPC ..... G01S 13/9011; G01S 13/9023; G06T 7/00
See application file for complete search history.

(56) References Cited

U.S. PATENT DOCUMENTS 6,583,751 B1 6/2003 Ferretti et al.
2011/0163911 A1 7/2011 Costantini et al.
(Continued)

FOREIGN PATENT DOCUMENTS

CN 109886910 A 6/2019
CN 110456345 A * 11/2019
(Continued)

OTHER PUBLICATIONS

Bruzzone L and D. F. Prieto, "Automatic analysis of the difference image for unsupervised change detection," in IEEE Transactions on Geoscience and Remote Sensing, vol. 38, No. 3, pp. 1171-1182, May 2000, (Year: 2000).*
(Continued)

*Primary Examiner* — Vladimir Magloire
*Assistant Examiner* — Bongani Jabulani Mashele
(74) *Attorney, Agent, or Firm* — Sughrue Mion, PLLC

(57) ABSTRACT

The image analyzing device calculates a phase difference image of a pair of images, calculates a phase difference between close pixels in the phase difference image, generates an evaluation function including a shooting time difference of the pair of images and taking a variable that is a displacement velocity difference of close pixels or an evaluation function including a baseline distance and taking a variable that is an elevation of close pixels, and optimizing the evaluation function for each pair of close pixels. The image analyzing device sets a threshold based on a result of evaluation of the random number using the evaluation function, and obtains merged data of an entire image by merging values of variables when performing optimization except for variables for which evaluation value using the evaluation function is below the threshold.

13 Claims, 21 Drawing Sheets

(56) References Cited

U.S. PATENT DOCUMENTS

2012/0019410 A1     1/2012    Ferretti et al.
2016/0033639 A1     2/2016    Jung et al.

FOREIGN PATENT DOCUMENTS

| JP | 2003-500658 A | 1/2003 |
| JP | 2009-162726 A | 7/2009 |
| JP | 2012-533051 A | 12/2012 |
| WO | 2010/000870 A1 | 1/2010 |

OTHER PUBLICATIONS

Fornaro, G., Pauciullo, A., & Serafino, F. (2009). Deformation monitoring over large areas with multipass differential SAR interferometry: a new approach based on the use of spatial differences. International Journal of Remote Sensing, 30(6), 1455-1478. (Year: 2009).*

International Search Report for PCT Application No. PCT/JP2020/013032, mailed on Jun. 23, 2020.

G. Fornaro, et al., "Deformation monitoring over large areas with multipass differential SAR interferometry: a new approach based on the use of spatial differences", International Journal of Remote Sensing, vol. 30, No. 6, Mar. 20, 2009, pp. 1455-1478.

Michael Schmitt et al., "Adaptive Covariance Matrix Estimation for Multi-Baseline InSAR Data Stacks", IEEE Transactions on Geoscience and Remote Sensing, vol. 52, Issue: 11, pp. 6807-6817, Feb. 19, 2014, Internet :<https://ieeexplore.ieee.org/document/6744585><DOI: 10.1109/TGRS.2014.2303516>.

Shohei Nakamura et al., "Coherence Estimation for SAR Images Using Adaptive Windows", Proceedings of IEICE, vol. J95-B, No. 3, pp. 459-470, Mar. 1, 2012, ISSN 1344-4697.

* cited by examiner

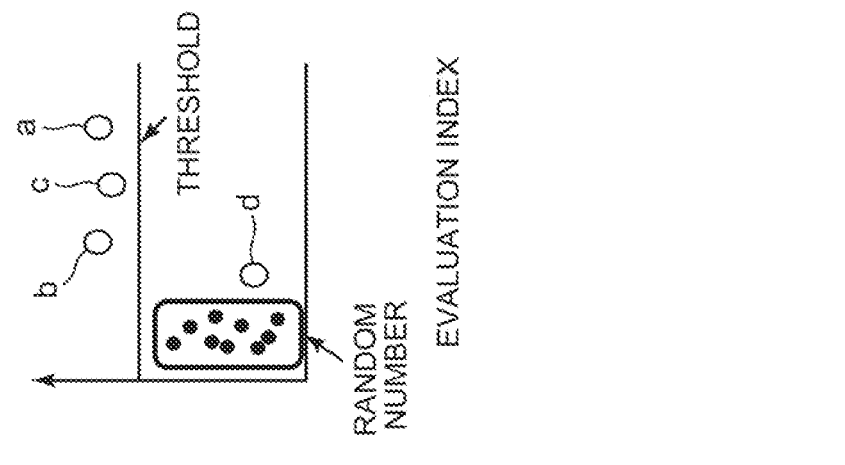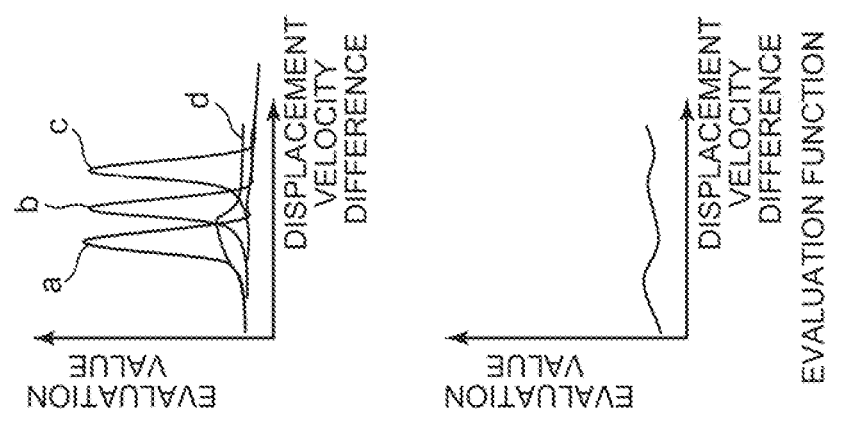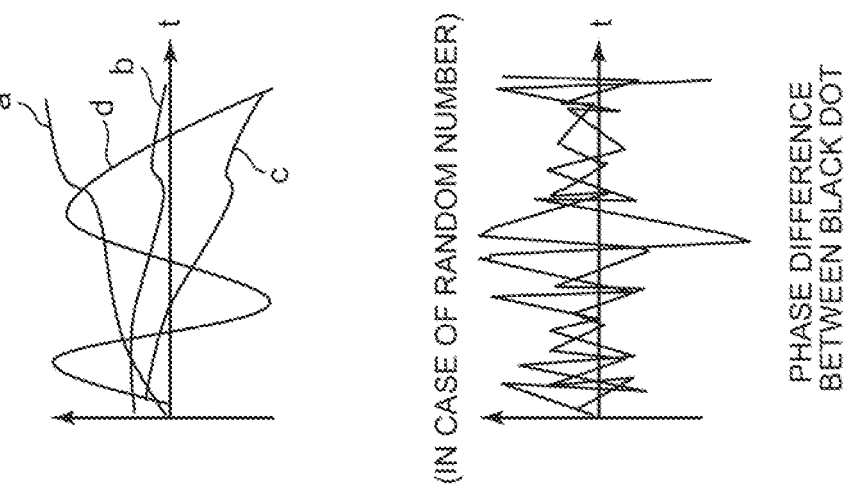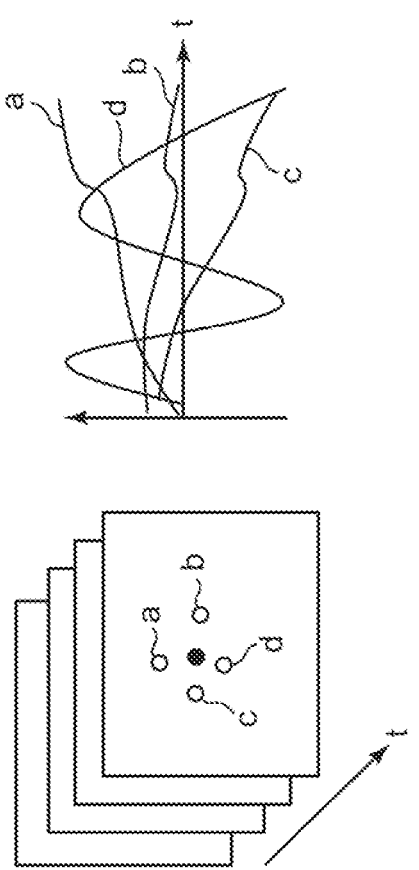

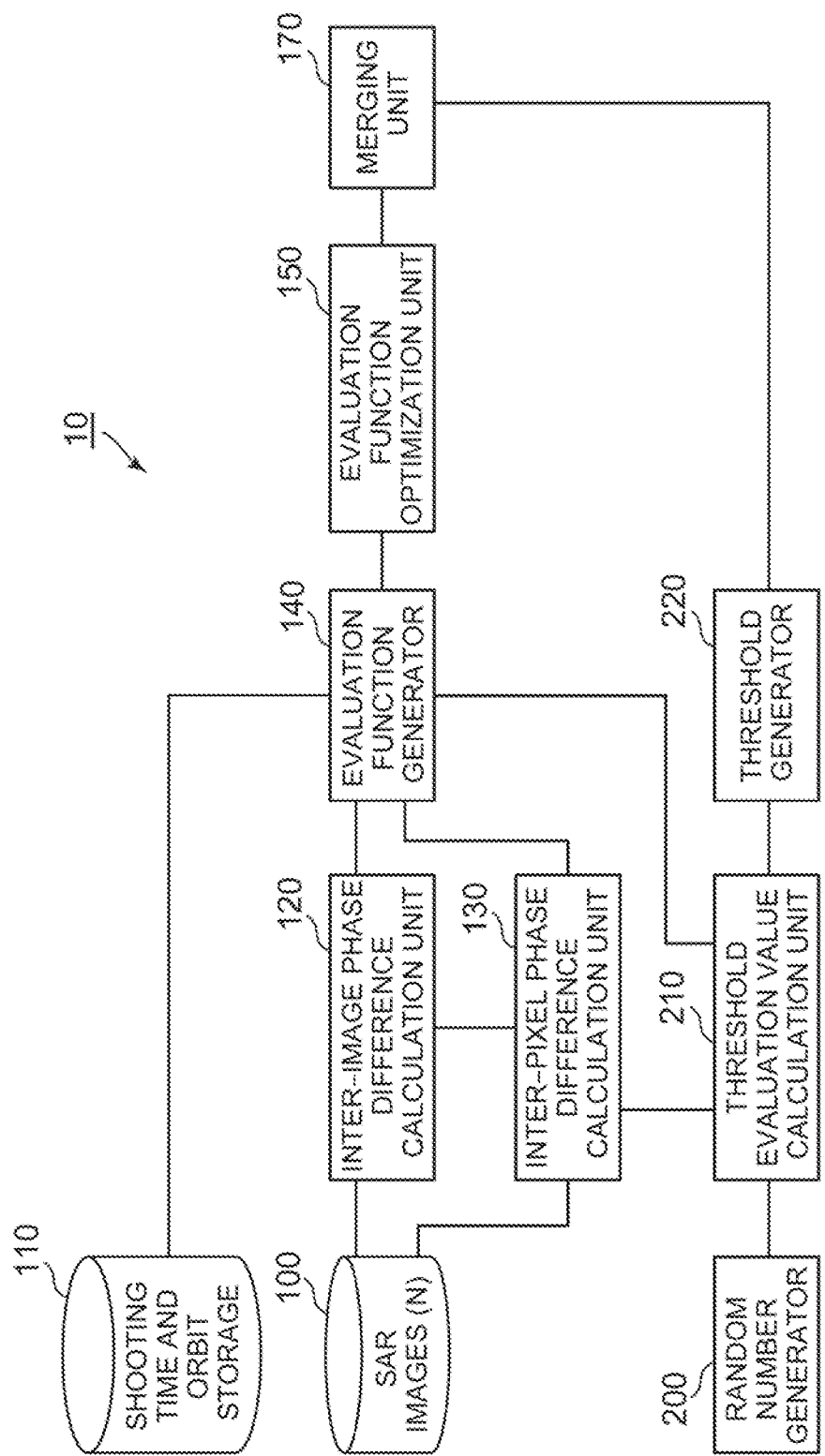

MERGING

PHASE DIFFERENCE BETWEEN BLACK DOT
(SLOPE = VELOCITY DIFFERENCE)

N SAR IMAGES

IMAGE ANALYZING DEVICE AND IMAGE ANALYZING METHOD

This application is a National Stage Entry of PCT/JP2020/013032 filed on Mar. 24, 2020, the contents of all of which are incorporated herein by reference, in their entirety.

TECHNICAL FIELD

This invention relates to an image analyzing device and an image analyzing method for performing image analysis.

BACKGROUND ART

Synthetic aperture radar (SAR) technology is a technology which can obtain an image equivalent to the image by an antenna having a large aperture, when a flying object such as artificial satellite, aircraft, or the like transmits and receives a radio wave while the flying object moves. The synthetic aperture radar is utilized, for example, for analyzing an elevation or a ground surface deformation by signal-processing reflected waves from the ground surface. When SAR technology is used, the image analyzing device takes time-series SAR images (SAR data) obtained by a synthetic aperture radar as input, and performs time-series analysis of the input SAR images.

Interferometric SAR analysis is an effective method for analyzing an elevation or a ground surface deformation. In the interferometric SAR analysis, the phase difference between radio signals of plural (for example, two) SAR images taken at different times is calculated. Then, a change in distance between the flying object and the ground that occurred during the shooting time period is detected.

When performing interferometric SAR analysis, a displacement and an elevation are generally assumed to vary linearly in time. For example, in the multi-temporal SAR analysis such as a method (Interferometry Stacking) stacking multiple (for example, three or more) SAR images to reduce noise, a linear displacement is often assumed.

Then, if a nonlinear displacement, etc. are large, an accurate analysis result might not be obtained.

A technique for SAR analysis with relatively high tolerance to a nonlinear displacement, etc. is described in patent literature 1. In the technique described in patent literature 1, coherence is calculated using a phase difference between close pixels. Points with valid displacement information are extracted, and the displacement velocity, etc. are determined based on phases on those points.

Non-patent literature 1 describes an interferometric SAR analysis using the multipath method. In the interferometric SAR analysis described in non-patent literature 1, a phase difference between neighboring pixels is calculated, and a displacement velocity and an elevation difference between neighboring pixels are calculated. Then, respective displacement velocities are merged. In addition, respective elevation differences are merged. Specifically, the evaluation function (evaluation formula of linear regression of phase) of equation (1) is optimized (in this case, maximized).

[Math. 1]

$$J(\Delta_{xl}Z_e, \Delta_{xl}v) = \mathrm{Re}\left\{\frac{1}{M}\sum_{(k,l)\in S}\underbrace{\Delta_{xl}a^{k,l}\exp\left[-j\frac{4\pi}{\lambda}\underbrace{\Delta_{xl}v\Delta t^{k,l}}_{Displacement}\right]\exp\left[-j\frac{4\pi}{\lambda}\underbrace{\beta^{k,l}\Delta_{xl}Z_e}_{\substack{elevation\\difference}}\right]}_{\substack{Phase\\difference}}\right\} \quad (1)$$

In equation (1), Ze indicates a height. $\Delta_{xl}Z_e$ indicates an elevation difference between neighboring pixels. v indicates a displacement velocity. $\Delta t^{k,l}$ indicates a temporal baseline. The baseline corresponds to a difference in shooting time between the image k and the image 1. Hereafter, this difference is referred to as the shooting time difference. $\Delta_{xl}v\Delta t^{k,l}$ indicates the velocity difference between neighboring pixels. $\Delta_{xl}a^{k,l}$ indicates a value corresponding to the phase difference. $\beta^{k,l}$ is a value associated with the vertical baseline. The vertical baseline is a distance between the orbits when images k and l were taken, respectively. This distance is hereafter referred to as the baseline distance. S is a set of interferometric SAR images obtained from a pair of (k,l).

The respective obtained displacement velocities are then merged over the entire image using the merging equation of equation (2). When the displacement velocity after merging is not converged, optimization using equation (1) is performed again. "Convergence" means, for example, that a difference between the displacement velocity obtained by optimization using equation (1) and the displacement velocity obtained before the re-optimization is less than a predetermined value (as an example, less than a predetermined threshold).

[Math. 2]

$$v = \frac{1}{\sum_p w(p)}\sum_p w(p)[v(p) - \Delta v(p)] \quad (2)$$

In equation (2), p corresponds to the image number. W(p) is a weight in the pth interferometric SAR image. The weight is a parameter that contributes to noise reduction. Equation (2) is a merging equation for a displacement velocity, however it is also merged for an elevation difference in the same way.

CITATION LIST

Patent Literature

PTL 1: International Publication No. 2010/000870

Non Patent Literature

NPL 1: G. Fornaro, et. al., "Deformation monitoring over large areas with multipass differential SAR interferometry: a new approach based on the use of spatial differences", International Journal of Remote Sensing, Vol. 30, No. 6, 20 Mar. 2009, 1455-1478

SUMMARY OF INVENTION

Technical Problem

The interferometric SAR analysis described in non-patent literature 1 can obtain an average linear displacement velocity and an average elevation difference that are somewhat robust to spatially smooth but temporally nonlinear phase motions. However, according to the interferometric SAR analysis described in non-patent literature 1, the displacement velocity and the elevation difference may not converge or may converge to incorrect values when extremely nonlinear phase motion in time is included.

FIGS. 22A to 22C are explanatory diagrams showing an example of convergence to an incorrect value. As shown in FIG. 22(A), there are N SAR images (specifically, interferometric SAR images), as an example. In addition, take as an example the respective phase differences between the pixel indicated by the black dot and its neighboring pixels a to d. FIG. 22(B) shows an example of changes in the respective phase differences. The phase differences between pixels a-c and the pixel indicated by the black dot varies almost linearly, however the phase difference between pixel d and the pixel indicated by the black dot varies rapidly in space and has an extremely large degree of non-linearity.

As illustrated in FIG. 22(C), the displacement velocities v based on the phase differences between the pixels a to c and the pixel indicated by the black dot converges to a similar value X, however the displacement velocity v based on the phase difference between the pixel d and the pixel indicated by the black dot converges to the value Y which is far from the value X. Under such circumstances, when the displacement velocities are merged over the entire image, including the phase difference between the pixel d and the pixel indicated by the black dot, the merging result will be erroneous. The same argument can be made for an elevation.

It is an object of the present invention to provide an image analyzing device and an analysis method that can obtain a highly reliable merging result when obtaining a displacement velocity and an elevation of an entire image by merging pixel-by-pixel displacement velocity differences and elevation differences based on phase differences.

Solution to Problem

The image analyzing device according to the present invention includes inter-image phase difference calculation means for calculating a phase difference image of a pair of images, inter-pixel phase difference calculation means for calculating a phase difference between close pixels in the phase difference image, evaluation function generation means for generating an evaluation function that includes at least the phase difference between pixels, optimization means for optimizing the evaluation function for each pair of pixels or each pair of close pixels, random number generation means for generating a random number, threshold setting means for setting a threshold based on a result of evaluation of the random number using the evaluation function, and merging means for obtaining merged data of an entire image by merging values of variables when the optimization means performs optimization except for variables for which evaluation value using the evaluation function is less than the threshold.

The image analyzing method according to the present invention includes calculating a phase difference image of a pair of images, calculating a phase difference between close pixels in the phase difference image, generating an evaluation function that includes at least the phase difference between pixels, optimizing the evaluation function for each pair of pixels or each pair of close pixels, generating a random number, setting a threshold based on a result of evaluation of the random number using the evaluation function, and obtaining merged data of an entire image by merging values of variables when the evaluation function is optimized except for variables for which evaluation value using the evaluation function is less than the threshold.

The image analyzing program according to the present invention causes a computer a process of calculating a phase difference image of a pair of images, a process of calculating a phase difference between close pixels in the phase difference image, a process of generating an evaluation function that includes at least the phase difference between pixels, a process of optimizing the evaluation function for each pair of pixels or each pair of close pixels, a process of generating a random number, a process of setting a threshold based on a result of evaluation of the random number using the evaluation function, and a process of obtaining merged data of an entire image by merging values of variables when the evaluation function is optimized except for variables for which evaluation value using the evaluation function is less than the threshold.

Advantageous Effects of Invention

According to the present invention, a highly reliable merging result can be obtained.

BRIEF DESCRIPTION OF DRAWINGS

FIG. 1A It depicts an explanatory diagram for explaining schematic concept of each example embodiment.

FIG. 1B It depicts an explanatory diagram for explaining schematic concept of each example embodiment.

FIG. 1C It depicts an explanatory diagram for explaining schematic concept of each example embodiment.

FIG. 1D It depicts an explanatory diagram for explaining schematic concept of each example embodiment.

FIG. 2 It depicts a block diagram showing a configuration example of the image analyzing device of the first example embodiment.

DESCRIPTION OF EMBODIMENTS

Figure 3:
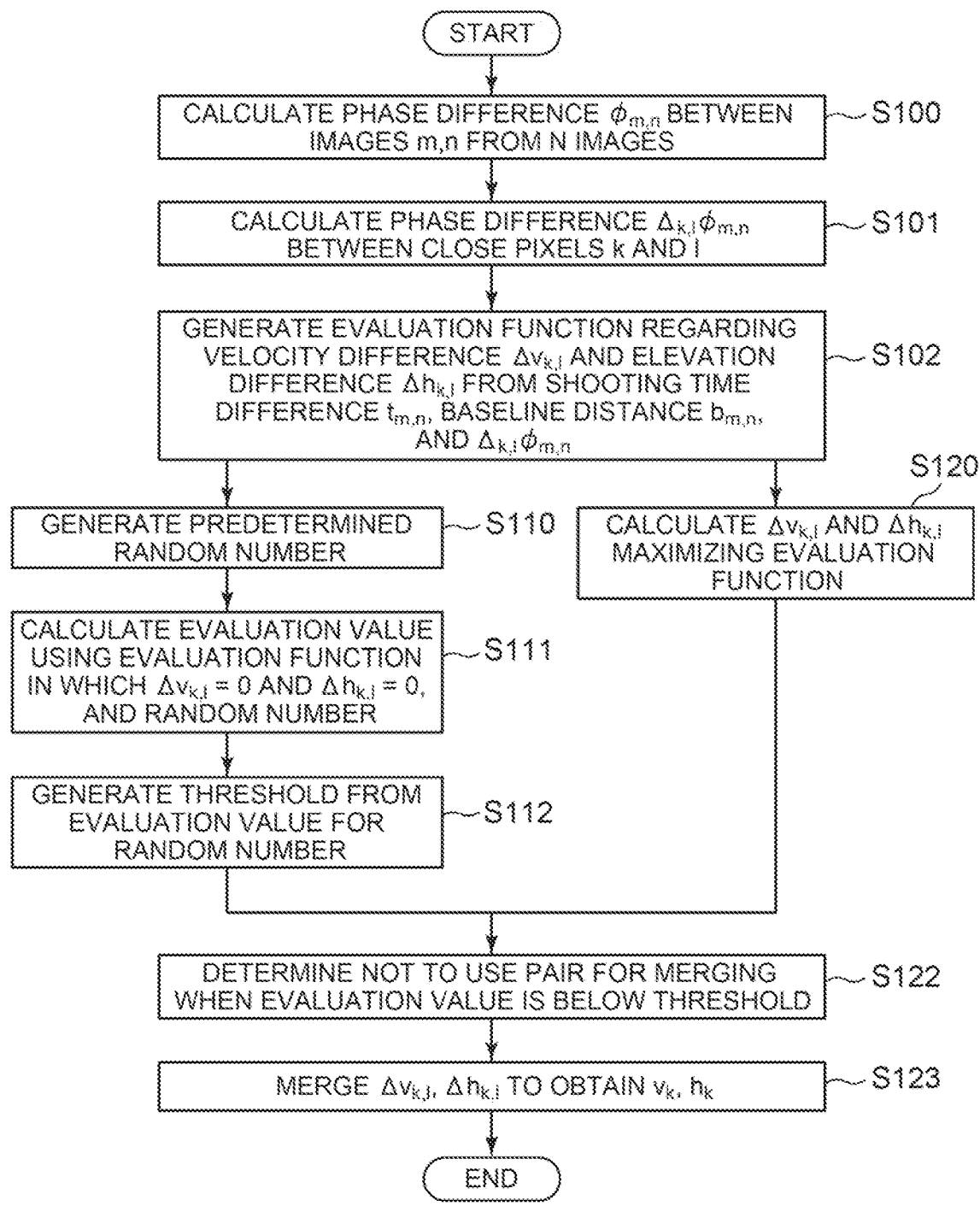
FIG. 3 It depicts a flowchart showing an example of an operation of the image analyzing device of the first example embodiment.

Hereinafter, example embodiments of the present invention will be described with reference to the drawings.

First, schematic concept of each example embodiment will be described with reference to explanatory diagrams of FIGS. 1A-1D.

As shown in FIG. 1(A), there are N SAR images (specifically, interferometric SAR images), as an example. In addition, take as an example the respective phase differences between the pixel indicated by the black dot and its neighboring pixels a to d. FIG. 1(B) shows an example of changes in the respective phase differences in the upper side. The phase differences between the pixels a-c and the pixel indicated by the black dot varies almost linearly, however the phase difference between the pixel d and the pixel indicated by the black dot varies rapidly in space and has an extremely large degree of non-linearity.

In each example embodiment, a predetermined random number is generated and the evaluation function is optimized (for example, maximized) using the random number as the phase difference. FIG. 1(B) shows in the lower side an example of the change in phase difference with the pixel indicated by the black dot when a random number is used.

FIG. 1(C) shows an example of an evaluation value (calculated value of the evaluation function) regarding displacement velocities of the pixels a-d and an evaluation value regarding displacement velocities when using random numbers. As illustrated in the upper side of FIG. 1(C), the evaluation value related to pixel d is small. In addition, as illustrated in the lower side of FIG. 1(C), the evaluation values when using random numbers are generally smaller.

Therefore, in case each evaluation value using each random number is used as an evaluation index, when an evaluation value using an actual displacement velocity difference (displacement velocity difference based on an observed phase difference) is smaller than the evaluation index, the pair (the set) of pixels that present that the displacement velocity difference is excluded from the displacement velocity evaluation target.

In each example embodiment, the maximum value (or the average value), to which a margin is added, of each of the evaluation values when random numbers are used is set to the threshold, for example. Then, when the evaluation value of the displacement velocity difference is less than the threshold, the pair of pixels presenting that displacement velocity difference is excluded.

Although FIGS. 1A-1D show the concept regarding a threshold using a displacement velocity as an example, the same concept can be applied to an elevation as an example.

Example Embodiment 1

FIG. 2 is a block diagram showing a configuration example of the image analyzing device of the first example embodiment. The image analyzing device 10 shown in FIG. 2 includes a SAR image storage 100, a shooting time and orbit storage 110, an inter-image phase difference calculation unit 120, an inter-pixel phase difference calculation unit 130, an evaluation function generator 140, an evaluation function optimization unit 150, a merging unit 170, a random number generator 200, a threshold evaluation value calculation unit 210, and a threshold generator 220. In the first to eighth example embodiments, interferometric SAR images are illustrated as images, however the images that can be handled in each example embodiment are not limited to interferometric SAR images, and other types of images such as SAR images can also be handled.

The SAR image storage 100 stores N (N≥3) SAR images (specifically, interferometric SAR images). The shooting time and orbit storage 110 stores information (data) indicating a shooting time of the SAR image and information (data) capable of identifying the orbit of a flying object at the time the image was taken.

The inter-image phase difference calculation unit 120 calculates a phase difference ($\varphi_{m,n}$ (m, n≤N) between a pair of SAR images. The phase difference (phase difference between two SAR images) between a pair of SAR images means a phase difference between corresponding pixels in respective images. The inter-image phase difference calculation unit 120 may calculate the phase difference of all pairs in the N SAR images, however, the inter-image phase difference calculation unit 120 may also calculate the phase difference for some of the pairs.

The inter-pixel phase difference calculation unit 130 calculates a phase difference between pixels in a single phase difference image. For example, for the SAR image m and the SAR image n, $\Delta_{k,l}\varphi_{M,N}$ is calculated as the phase difference between close pixels k and l. Similarly, the inter-pixel phase difference calculation unit 130 calculates, for all phase difference images calculated by the inter-image phase difference calculation unit 120, phase differences between various pairs of close pixels.

The evaluation function generator 140 generates an evaluation function. In the first example embodiment, the evaluation function of equation (3) is generated, for example.

[Math. 3]

$$J(\Delta v_{k,l}, \Delta h_{k,l}, \Delta_{k,l}\phi_{\cdot,\cdot}) = \sum_{m,n} w_{m,n} \cos(\Delta_{k,l}\phi_{m,n} - t_{m,n}\Delta v_{k,l} - b_{m,n}\Delta h_{k,l}) \quad (3)$$

In equation (3), "·" indicates all elements. For example, "·,·" in $\varphi$, means phase differences of all pairs. $w_{m,n}$ is a weight for a phase difference between a SAR image m and a SAR image n. $t_{m,n}$ is a shooting time difference. $b_{m,n}$ is a baseline distance. Thus, equation (3) is an evaluation function of pixels k and l regarding a displacement velocity difference $\Delta v_{k,l}$ and an elevation difference $\Delta h_{k,l}$ using the shooting time difference $t_{m,n}$, the baseline distance $b_{m,n}$, and the phase difference $\Delta_{k,l}\varphi_{m,n}$.

The evaluation function optimization unit 150 calculates the displacement velocity difference $\Delta v_{k,l}$ and the elevation difference $\Delta h_{k,l}$ that maximizes the evaluation function for each pair of pixels.

The merging unit 170 merges the displacement velocity differences $\Delta v_{k,l}$ to obtain the displacement velocity $v_k$ in the entire image. The merging unit 170 also merges the elevation differences $\Delta h_{k,l}$ to obtain the elevation $h_k$ in the entire image. The merging unit 170 may repeat the calculation of the evaluation function in the merging process until the predetermined merging equation converges to the optimal value.

The random number generator 200 generates a predetermined random number. The threshold evaluation value calculation unit 210 applies the generated random number to the displacement velocity difference and the elevation difference and calculates an evaluation value using the evaluation function of equation (3). The threshold generator 220 determines a threshold based on the evaluation value.

Next, the operation of the image analyzing device 10 will be described with reference to the flowchart of FIG. 3.

The inter-image phase difference calculation unit 120 calculates phase differences $\varphi_{m,n}$ between pairs of SAR images in the N SAR images stored in the SAR image storage 10 to obtain a phase difference image (step S100). The inter-pixel phase difference calculation unit 130 calculates phase difference $\Delta_{k,l}\varphi_{m,n}$ between close pixels k and l in one phase difference image (step S101). The close pixels k, l may be a pair of pixels that are adjacent to each other vertically, horizontally, left or right, two pixels that sandwich one pixel, or a pair of pixels that are within a certain radius of one pixel. The inter-pixel phase difference calculation unit 130 may generate such a pair as described above only for some pixels in the image. When the pairs are generated only for some pixels in the image, information such as displacement, etc. is finally obtained only for some pixels.

The evaluation function generator 140 generates an evaluation function (equation (3)) that includes the shooting time difference $t_{m,n}$, the baseline distance $b_{m,n}$, and the phase difference $\Delta_{k,l}\varphi_{m,n}$ (step S102).

The random number generator 200 generates a predetermined random number (step S110). The predetermined random number is a uniform random number between $-\pi$ and $\pi$, as an example.

The threshold evaluation value calculation unit 210 sets $\Delta v_{k,l}=0$ and $\Delta h_{k,l}=0$ in the evaluation function of equation (3) and regards the generated random number as a phase difference to calculate an evaluation value (step S111). It should be noted that, in detail, the random numbers are applied as phases before $\varphi_{m,n}$ is calculated, instead of assigning a random numbers to $\varphi_{m,n}$. The threshold evaluation value calculation unit 210 uses a value (for example, average value×3) based on an average of the values of the evaluation functions calculated using a large number of random numbers as the evaluation value, for example. The threshold evaluation value calculation unit 210 may also use a value based on an average value to which a variance is added as the evaluation value.

The threshold generator 220 determines the threshold based on the evaluation value (step S112). The threshold generator 220 uses the evaluation value itself calculated by the threshold evaluation value calculation unit 210, or the evaluation value to which a margin is added, to the threshold.

The evaluation function optimization unit 150 calculates for each pair of pixels the displacement velocity difference $\Delta v_{k,l}$ and the elevation difference $\Delta h_{k,l}$ that maximizes the evaluation function (equation (3)) (step S120).

The merging unit 170 checks whether any of the evaluation function values (evaluation values) calculated by the evaluation function optimization unit 150 have an evaluation value less than the threshold. When there are evaluation values below the threshold, the merging unit 170 determines not to use in the merging process the pair of pixels that was used when the evaluation value was calculated (step S122).

The merging unit 170 then executes the merging process (step S123). The merging process is a process which merges the displacement velocity differences $\Delta v_{k,l}$ to obtain the displacement velocity $v_k$ in the entire image, and merges the elevation differences $\Delta h_{k,l}$ to obtain the elevation $h_k$ for the entire image by the merging unit 170. As mentioned above, the merging unit 170 does not use the pairs of pixels that were used when the evaluation value below the threshold was calculated in the merging process.

As explained above, in the first example embodiment, the threshold generator 220 calculates the evaluation value using random numbers and an evaluation function, and determines a threshold based on the calculated evaluation value, and the merging unit 170 executes a merging process by excluding pairs of pixels used when an evaluation value is calculated to be less than the threshold. The threshold is a similar value to the evaluation value corresponding to the displacement velocity difference which varies rapidly in space and has an extremely large degree of non-linearity. Therefore, by performing the merging process excluding the pairs of pixels used when the evaluation value below the threshold is calculated, a highly reliable merging result can be obtained.

Example Embodiment 2

Figure 4:
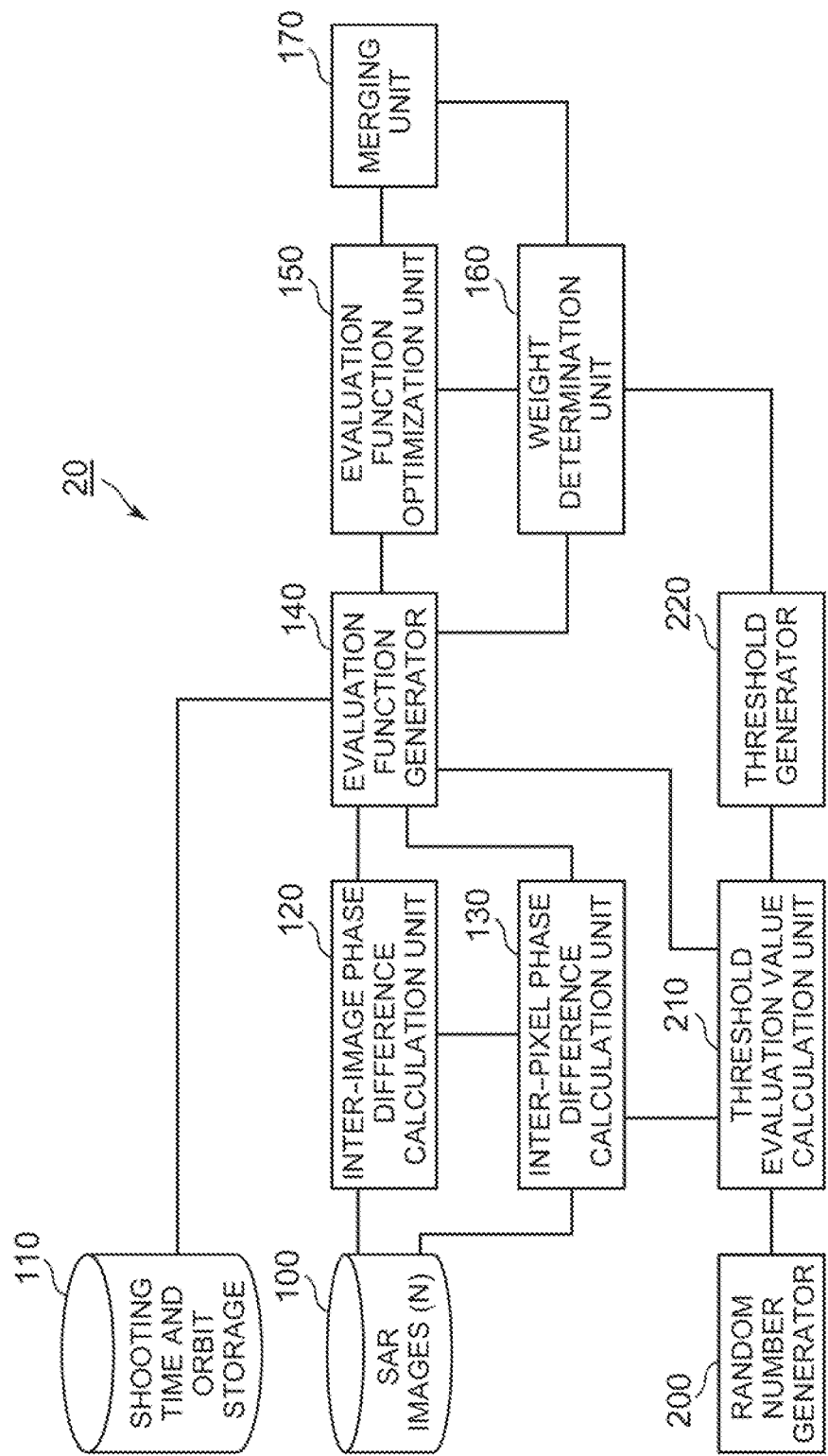
FIG. 4 It depicts a block diagram showing a configuration example of the image analyzing device of the second example embodiment.

FIG. 4 is a block diagram showing a configuration example of the image analyzing device of the second example embodiment. The image analyzing device 20 shown in FIG. 4 includes the SAR image storage 100, the shooting time and orbit storage 110, the inter-image phase difference calculation unit 120, the inter-pixel phase difference calculation unit 130, the evaluation function generator 140, the evaluation function optimization unit 150, a weight determination unit 160, the merging unit 170, the random number generator 200, the threshold evaluation value calculation unit 210, and the threshold generator 220.

The components other than the weight determination unit 160 are the same as the components in the first example embodiment. However, the merging unit 170 performs a process different from the process in the first example embodiment. The weight determination unit 160 calculates the weights $Wv_{k,l}$, $Wh_{k,l}$.

Next, the operation of the image analyzing device 20 will be described with reference to the flowchart of FIG. 5. The processes of steps S100-S120 are the same as the processes in the first example embodiment (refer to FIG. 3).

In the second example embodiment, the weight determination unit 160 calculates the weights $Wv_{k,l}$, $Wh_{k,l}$ (step S121). The weight determination unit 160 uses the second-order differential or the like when calculating a weight. The weight determination unit 160 gives a weight proportional to the second-order differential to the evaluation value (calculated value of the evaluation function), for example.

When there is an evaluation value below the threshold, the weight determination unit 160 sets the weights $Wv_{k,l}$, $Wh_{k,l}$ corresponding to the pair of pixels used when the evaluation value was calculated to 0 (step S124).

The merging unit 170 merges the displacement velocity differences $\Delta v_{k,l}$ in the merging process to obtain the displacement velocity $v_k$ in the entire image. The merging unit 170 also merges the elevation differences $\Delta h_{k,l}$ in the merging process to obtain the elevation $h_k$ in the entire image.

That is, in the merging process, the merging unit 170 calculates the displacement velocity $v_k$ and the elevation $h_k$ in the entire image using equation (4), the displacement velocity differences $\Delta v_{k,l}$ and the elevation differences $\Delta h_{k,l}$ obtained in the process of step S120, for example. When the calculated displacement velocity and the elevation are not converged, equation (4) is applied repeatedly to the other pixels until convergence is achieved (step S125).

[Math. 4]

$$v_k = \frac{\sum_l W_{v_{k,l}}(v_l - \Delta v_{k,l})}{\sum_l W_{v_{k,l}}}, \quad h_k = \frac{\sum_l W_{h_{k,l}}(h_l - \Delta h_{k,l})}{\sum_l W_{h_{k,l}}} \quad (4)$$

Figure 5:
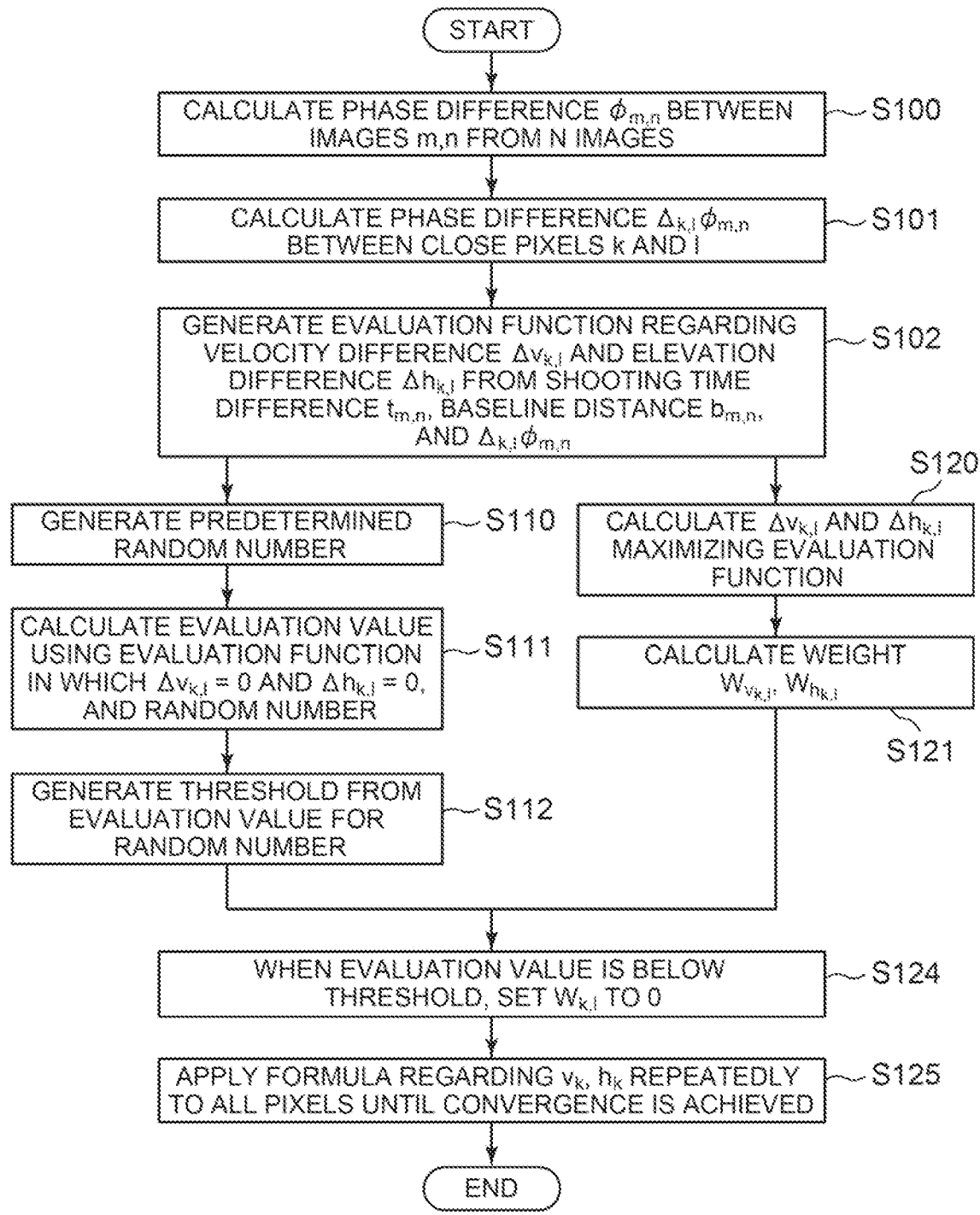
FIG. 5 It depicts a flowchart showing an example of an operation of the image analyzing device of the second example embodiment.

Once it is determined that equation (4) for $v_k$ and $h_k$ is converged, the process shown in FIG. 5 is terminated.

As explained above, even in the second example embodiment, the threshold generator 220 calculates the evaluation value using random numbers and an evaluation function, and determines a threshold based on the calculated evaluation value, and the merging unit 170 executes a merging process by excluding pairs of pixels used when an evaluation value is calculated to be less than the threshold. The threshold is a similar value to the evaluation value corresponding to the displacement velocity difference which varies rapidly in space and has an extremely large degree of non-linearity. Therefore, by performing the merging process excluding the pairs of pixels used when the evaluation value below the threshold is calculated, a highly reliable merging result can be obtained.

In addition, in the second example embodiment, since the weights $Wv_{k,l}$, $Wh_{k,l}$ are reflected in the merging process, convergence is easier to achieve in the merging process.

Example Embodiment 3

Figure 6:
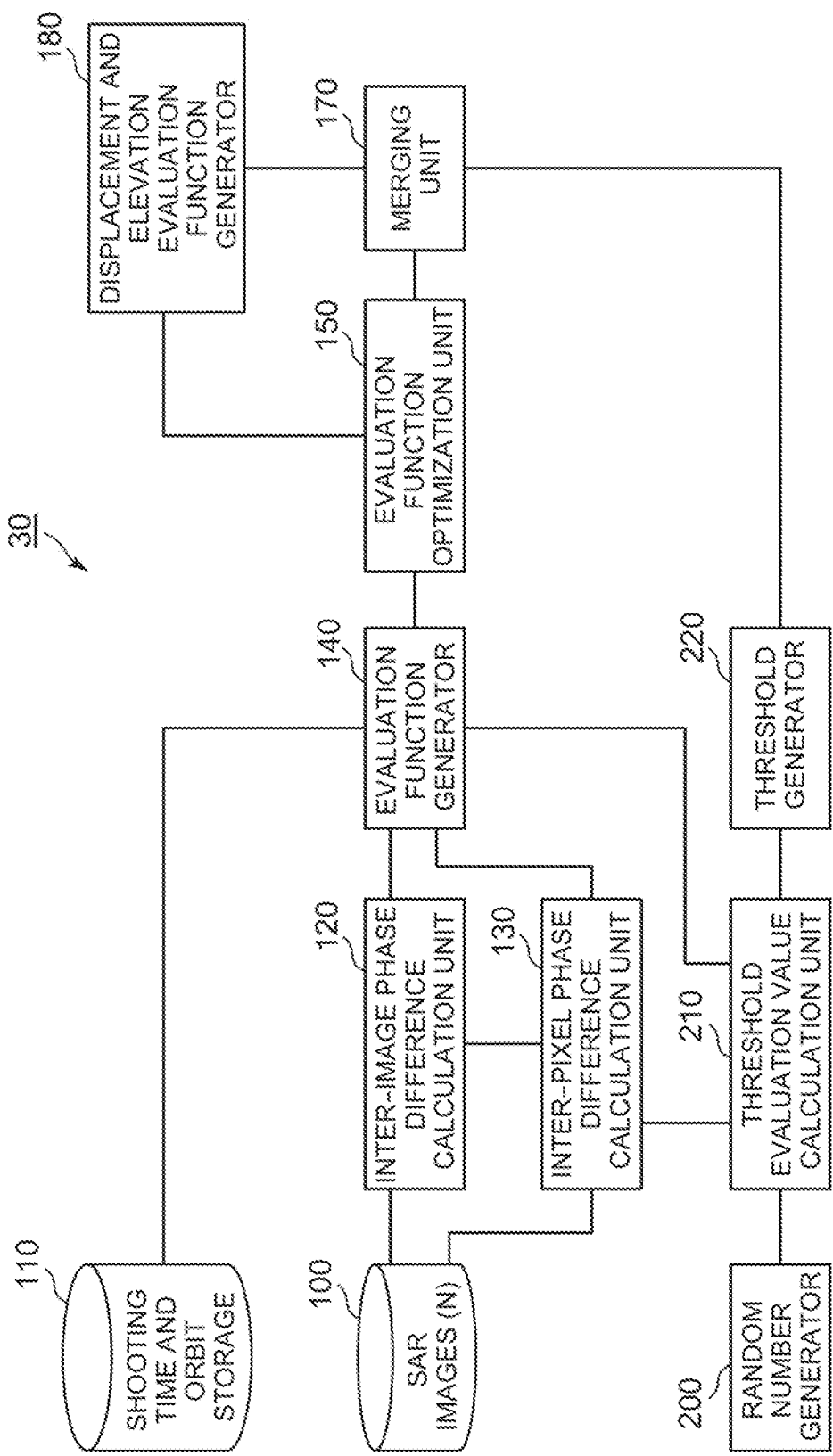
FIG. 6 It depicts a block diagram showing a configuration example of the image analyzing device of the third example embodiment.

FIG. 6 is a block diagram showing a configuration example of the image analyzing device of the third example embodiment. The image analyzing device 30 shown in FIG. 6 includes the SAR image storage 100, the shooting time and orbit storage 110, the inter-image phase difference calculation unit 120, the inter-pixel phase difference calculation unit 130, the evaluation function generator 140, the evaluation function optimization unit 150, the merging unit 170, a displacement and elevation evaluation function generator 180, the random number generator 200, the threshold evaluation value calculation unit 210, and the threshold generator 220.

The components other than the displacement and elevation evaluation function generator 180 are the same as the components in the first example embodiment shown in FIG. 2. However, the merging unit 170 performs the process in the first example embodiment and an added process.

In the third example embodiment, the merging process is executed by considering prior information indicating a degree to which a displacement velocity difference and an elevation of close pixels should be similar. The displacement and elevation evaluation function generator 180 generates a conditional formula (evaluation function) for evaluating a degree to which a displacement velocity difference and an elevation of close pixels are similar. For example, the displacement and elevation evaluation function generator 180 generates the conditional formula of equation (5).

[Math. 5]

$$\alpha_h|h_k - h_l|^2 + \beta_h h_k^2 + \alpha_v|v_k - v_l|^2 + \beta_v v_k^2 \quad (5)$$

In equation (5), $\alpha_v$ is a value representing how similar the displacement velocities $v_k$ at neighboring pixels are. $\alpha_n$ is a value representing how similar the heights (elevations) at neighboring pixels are. $\beta_v$ is a value representing how close to 0 the displacement velocity $v_k$ should be. $\beta_h$ is a value representing how close to 0 the elevation $h_k$ should be.

Figure 7:
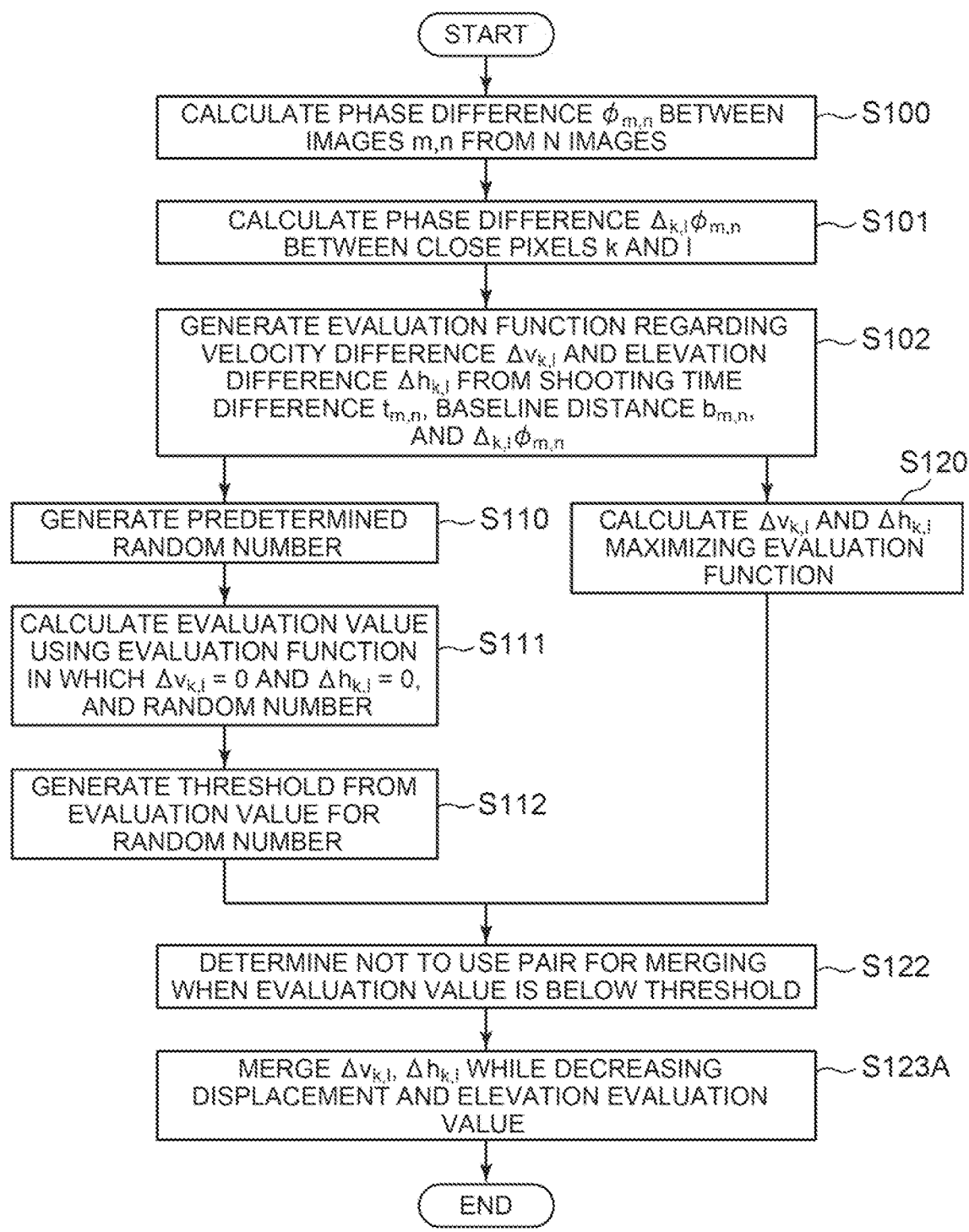
FIG. 7 It depicts a flowchart showing an example of an operation of the image analyzing device of the third example embodiment.

Next, the operation of the image analyzing device 30 will be described with reference to the flowchart of FIG. 7. The processes of steps S100-S122 are the same as the processes in the first example embodiment (refer to FIG. 3). In the third example embodiment, in the process of step S120, the evaluation function optimization unit 150 may optimize the evaluation function (equation (3)) generated by the evaluation function generator 140, however the evaluation function optimization unit 150 may optimize a function made by subtracting the formula (equation (5)) generated by the displacement and elevation evaluation function generator 180 from the evaluation function generated by the evaluation function generator 140.

In the third example embodiment, the merging unit 170 performs the same merging process as in the first example embodiment while decreasing the value of the conditional formula (equation (5)) generated by the displacement and elevation evaluation function generator 180 (step S123A).

In the third example embodiment, since the displacement and elevation evaluation function generator 180 generates a conditional formula for evaluating a degree to which a displacement velocity difference and an elevation difference of neighboring pixels are similar, and the merging unit 170 uses the conditional formula in the merging process, a displacement velocity and an elevation with respect to an imaginary pixel between the pixel k and the pixel l will now be used and a converged displacement velocity $v_k$ and a converged elevation $h_k$ are easier to obtain, even if it is difficult to obtain the optimal displacement velocity $v_k$ or the optimal elevation $h_k$ in the merging process (for example, the calculated value becomes 0 or does not converge).

Example Embodiment 4

Figure 8:
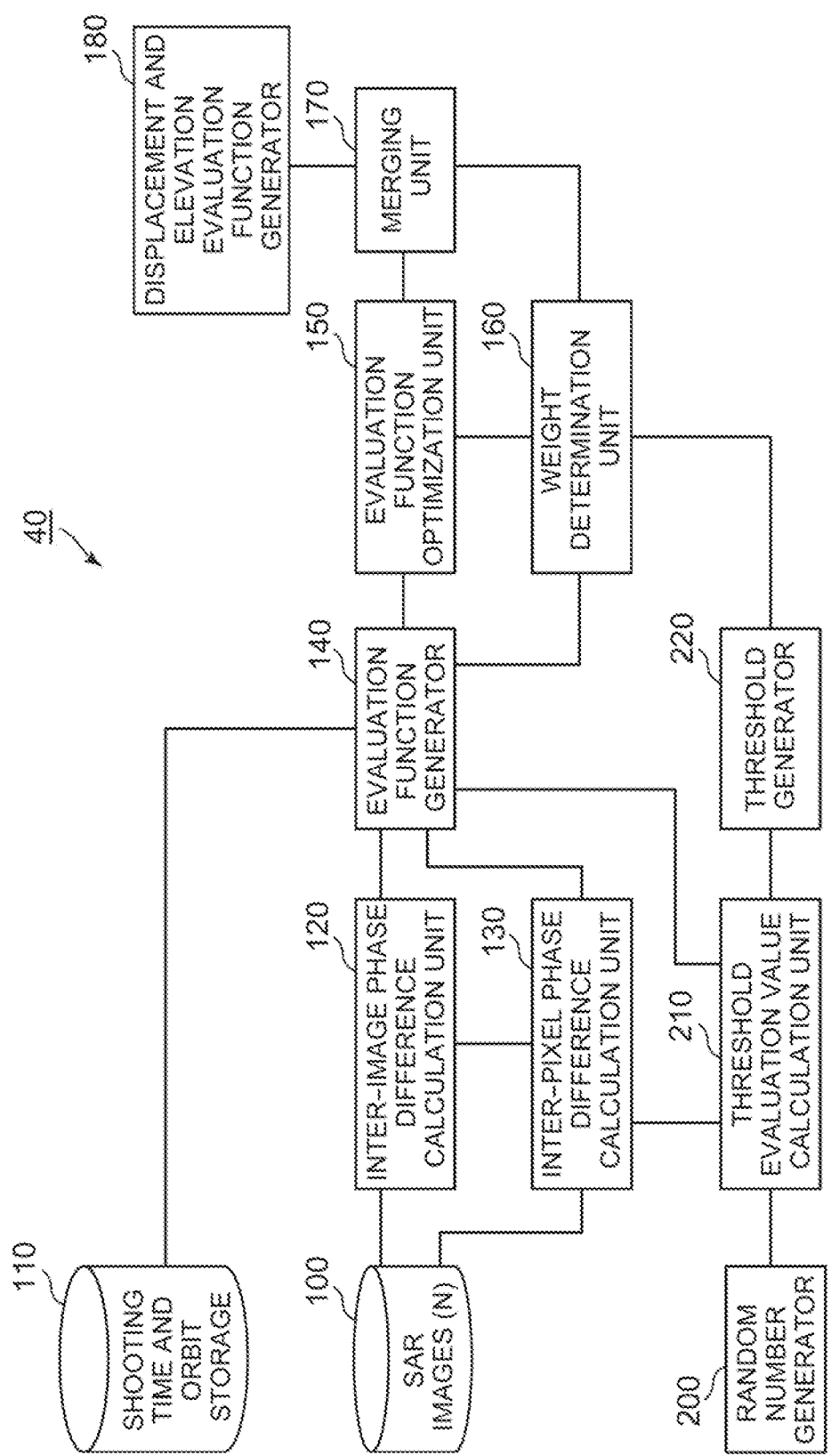
FIG. 8 It depicts a block diagram showing a configuration example of the image analyzing device of the fourth example embodiment.

FIG. 8 is a block diagram showing a configuration example of the image analyzing device of the fourth example embodiment. The image analyzing device 40 shown in FIG. 8 includes the SAR image storage 100, the shooting time and orbit storage 110, the inter-image phase difference calculation unit 120, the inter-pixel phase difference calculation unit 130, the evaluation function generator 140, the evaluation function optimization unit 150, the weight determination unit 160, the merging unit 170, the displacement and elevation evaluation function generator 180, the random number generator 200, the threshold evaluation value calculation unit 210, and the threshold generator 220.

The components other than the displacement and elevation evaluation function generator 180 are the same as the components in the second example embodiment shown in FIG. 4. However, the merging unit 170 performs the process in the second example embodiment and an added process. In addition, the displacement and elevation evaluation function generator 180 performs the same process as it of the displacement and elevation evaluation function generator 180 in the third example embodiment. That is, the displacement and elevation evaluation function generator 180 generates the conditional formula of equation (5).

Next, the operation of the image analyzing device 20 will be described with reference to the flowchart of FIG. 9. The processes of steps S100-S124 are the same as the processes in the second example embodiment (refer to FIG. 5).

The merging unit 170 merges the displacement velocity differences $\Delta v_{k,l}$ in the merging process to obtain a displacement velocity $v_k$ in the entire image. The merging unit 170 also merges the elevation differences $\Delta h_{k,l}$ in the merging process to obtain an elevation $h_k$ in the entire image.

In the fourth example embodiment, the merging unit 170 calculate a displacement velocity $v_k$ and an elevation $h_k$ using equation (6), the displacement velocity differences $\Delta v_{k,l}$ and the elevation differences $\Delta h_{k,l}$ obtained in the process of step S120. When the calculated displacement velocity $v_k$ and the elevation $h_k$ are not converged, equation (6) is applied repeatedly to the other pixels until convergence is achieved (step S125A).

[Math. 6]

$$v_k = \frac{\sum_l W_{h_{k,l}}(v_l - \Delta v_{k,l}) + \alpha_v v_l}{\beta_v + \sum_l (W_{v_{k,l}} + \alpha_v)}$$

$$h_k = \frac{\sum_l W_{h_{k,l}}(h_l - \Delta h_{k,l}) + \alpha_h v_l}{\beta_h + \sum_l (W_{h_{k,l}} + \alpha_h)}$$

(6)

Figure 9:
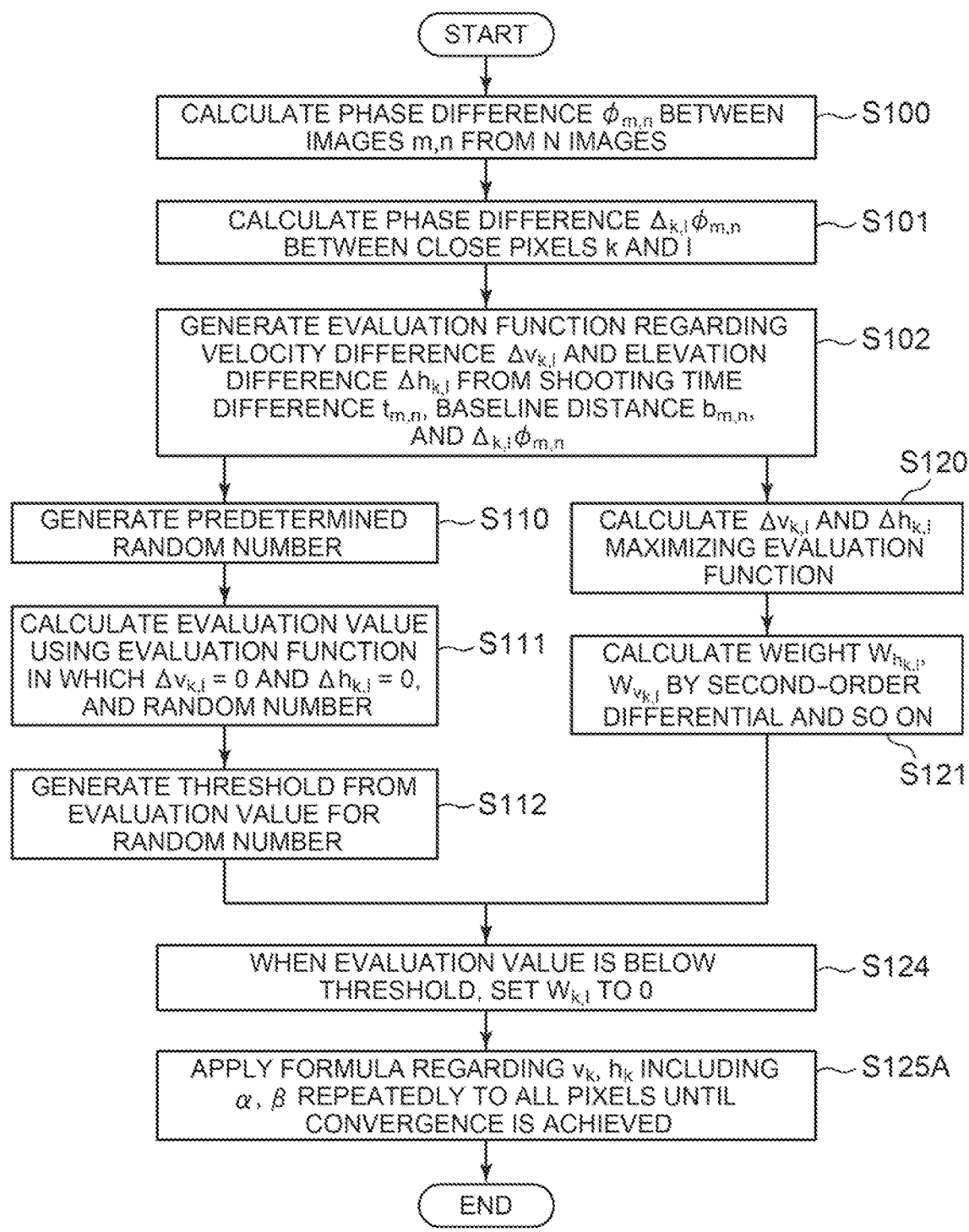
FIG. 9 It depicts a flowchart showing an example of an operation of the image analyzing device of the fourth example embodiment.

Once it is determined that equation (6) for $v_k$ and $h_k$ have converged, the process shown in FIG. 9 is terminated.

Since equation (6) includes $\alpha(\alpha_v, \alpha_h)$ and $\beta(\beta_v, \beta_h)$, the fourth example embodiment has the same effect as it of the third example embodiment.

Example Embodiment 5

Figure 10:
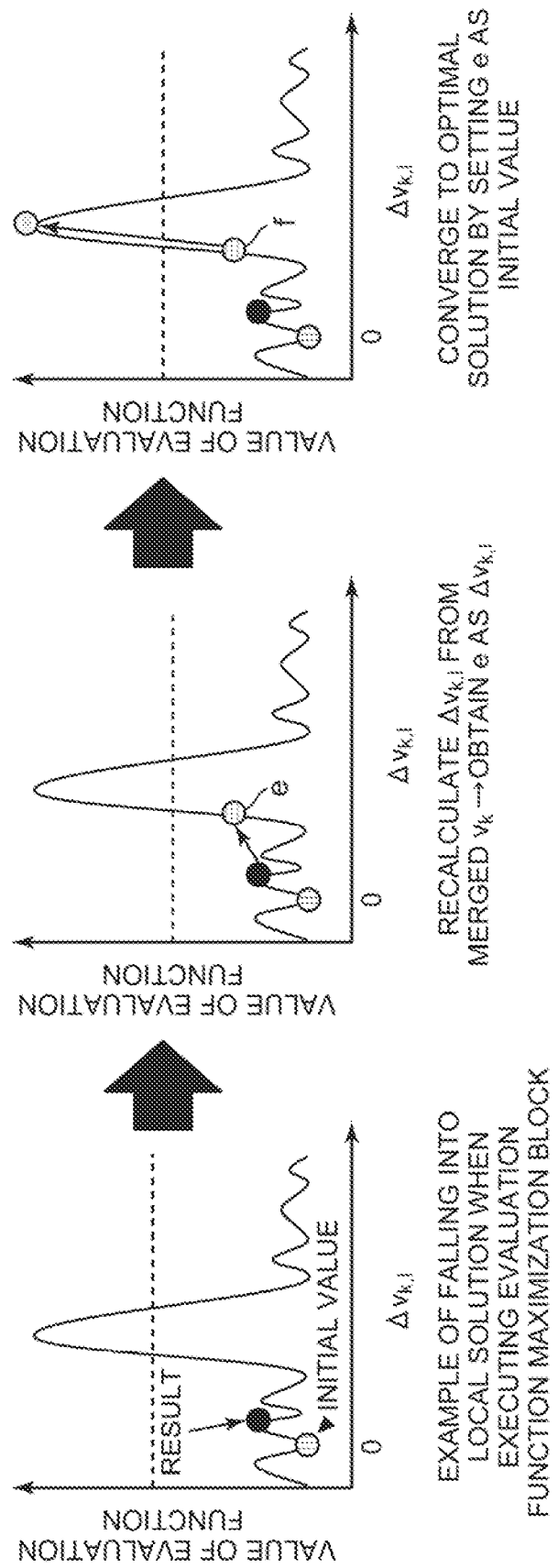
FIG. 10 It depicts an explanatory diagram for explaining improvement, etc. of falling into a local solution.

When performing optimization using an evaluation function, it is possible to fall into a local solution. FIG. 10 is an explanatory diagram for explaining improvement, etc. of falling into a local solution. As shown in FIG. 10, given an initial value of a certain condition, a non-optimal evaluation value may be obtained as a result of optimization. In the fifth example embodiment and the sixth example embodiment, the merged displacement velocity difference $\Delta v_{k,l}$ of the pixels k, l is recalculated. As a result, for example, it is assumed that the point e in FIG. 10 is obtained as the displacement velocity difference $\Delta v_{k,l}$. As shown in FIG. 10, the possibility of obtaining the evaluation value that is the optimal solution increases by performing the optimization again using the evaluation function with the displacement velocity difference $\Delta v_{k,l}$ of the point e as the initial value.

Although the displacement velocity difference $\Delta v_{k,l}$ is illustrated in FIG. 10, the same concept applies to the elevation difference $\Delta h_{k,l}$.

Figure 11:
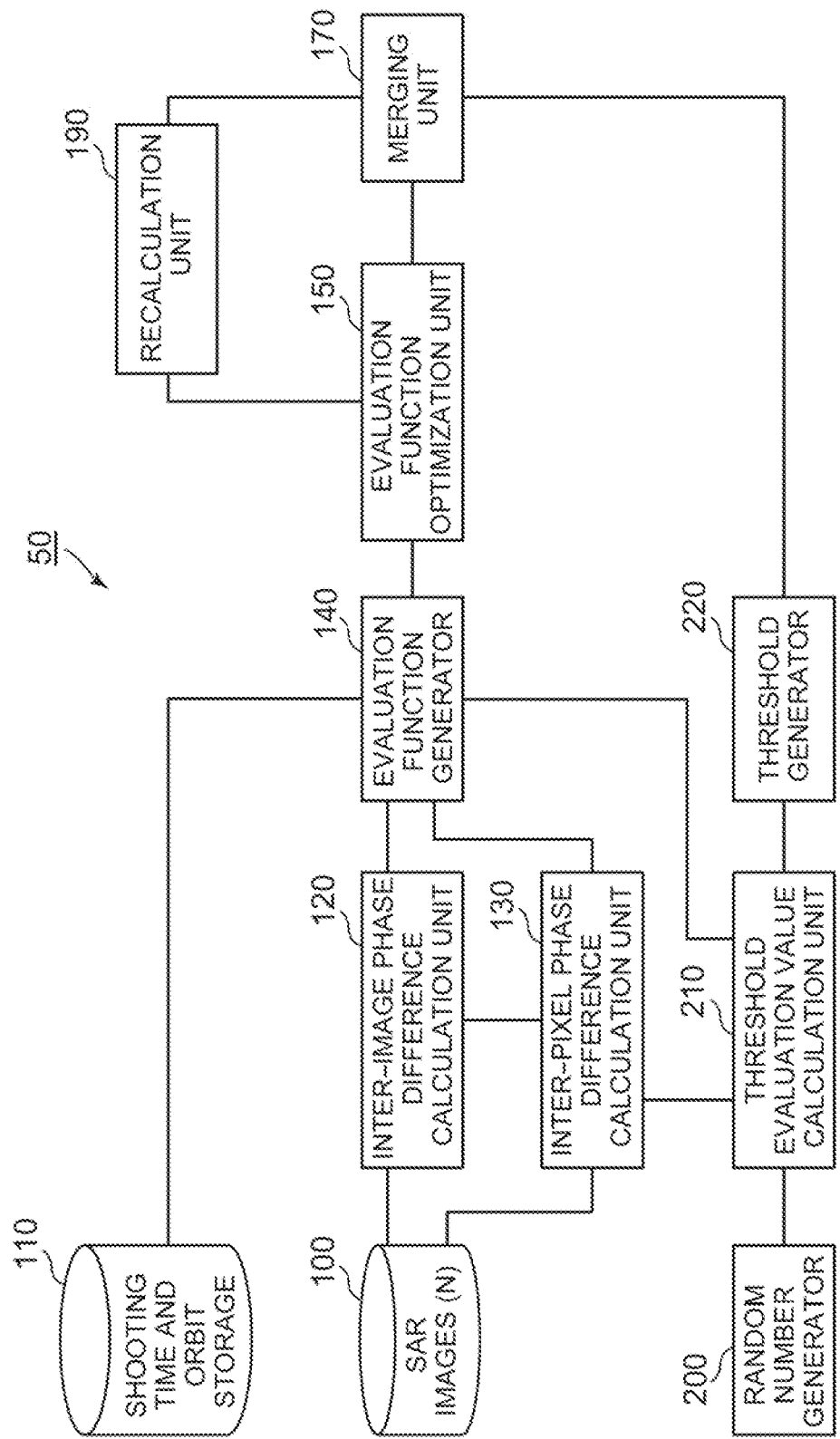
FIG. 11 It depicts a block diagram showing a configuration example of the image analyzing device of the fifth example embodiment.

FIG. 11 is a block diagram showing a configuration example of the image analyzing device of the fifth example embodiment. The image analyzing device 50 shown in FIG. 11 includes the SAR image storage 100, the shooting time and orbit storage 110, the inter-image phase difference calculation unit 120, the inter-pixel phase difference calculation unit 130, the evaluation function generator 140, the evaluation function optimization unit 150, the merging unit 170, a recalculation unit 190, the random number generator 200, the threshold evaluation value calculation unit 210, and the threshold generator 220.

The components other than the recalculation unit 190 are the same as the components in the first example embodiment shown in FIG. 2. However, the merging unit 170 performs the process in the first example embodiment and an added process.

The recalculation unit 190 recalculates the displacement velocity difference $\Delta v_{k,l}$ and the elevation difference $\Delta h_{k,l}$ of pixels k and l from the displacement velocity $v_k$ and the elevation $h_k$ calculated by the merging unit 170.

Figure 12:
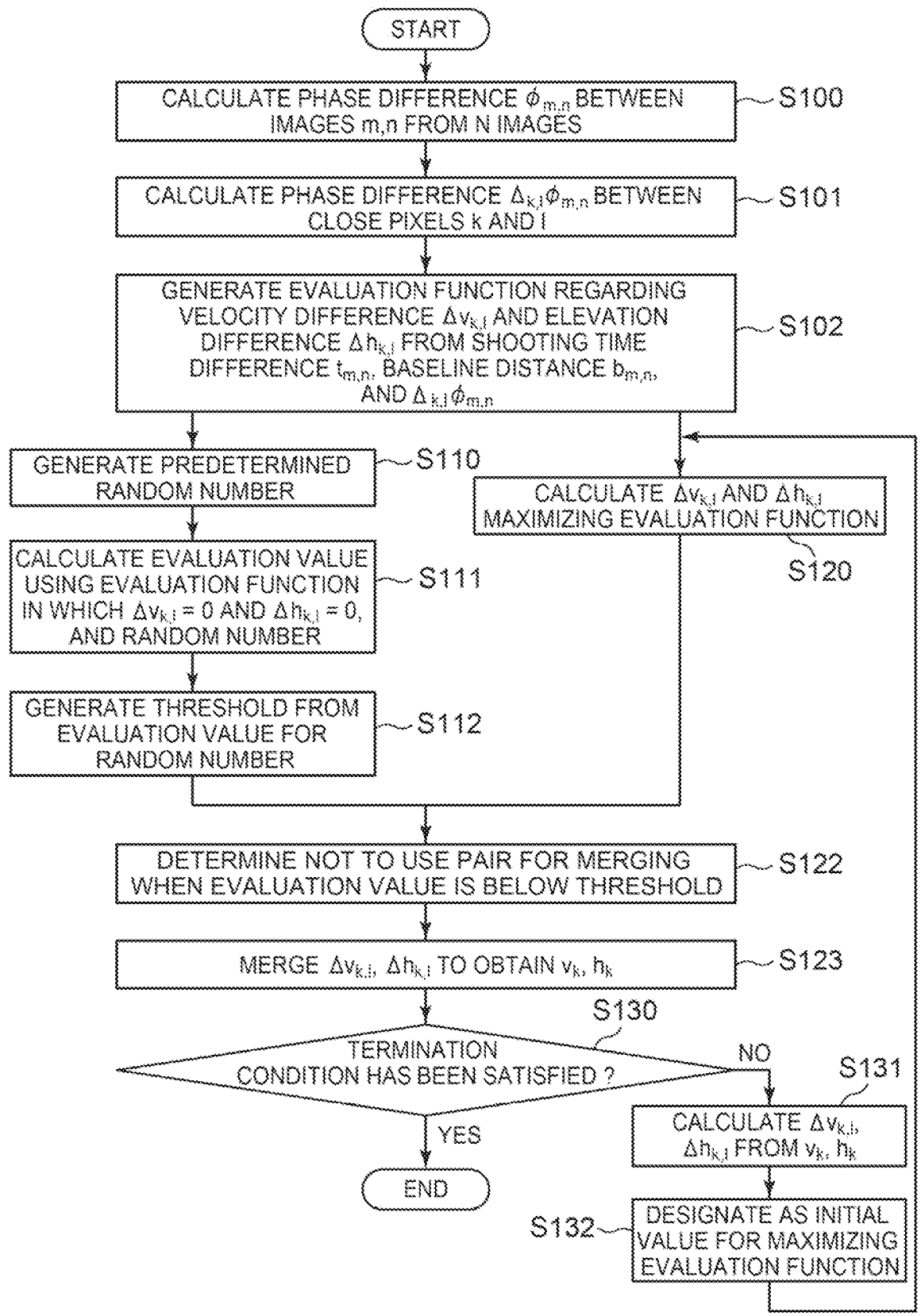
FIG. 12 It depicts a flowchart showing an example of an operation of the image analyzing device.

Next, the operation of the image analyzing device 50 will be described with reference to the flowchart of FIG. 12. The processes of steps S100-S123 are the same as the processes in the first example embodiment (refer to FIG. 3).

After executing the process of step S123, the merging unit 170 checks whether the termination condition has been satisfied (step S130).

The termination condition is, for example, a condition using the result (displacement velocity difference $\Delta v_{k,l}$ and elevation difference $\Delta h_{k,l}$) of the process of optimization input to the merging unit 170. As an example, the merging unit 170 determines that the termination condition is satisfied, when the displacement velocity difference $\Delta v_{k,l}$ and the elevation difference $\Delta h_{k,l}$ from the evaluation function optimizer 150 is not changed from the displacement velocity difference $\Delta v_{k,l}$ and the elevation difference $\Delta h_{k,l}$ previously input from the evaluation function optimizer 150.

The merging unit 170 may determine that the termination condition is satisfied, when the situation, that the displacement velocity difference $\Delta v_{k,l}$ and the elevation difference $\Delta h_{k,l}$ from the evaluation function optimizer 150 is not changed from the displacement velocity difference $\Delta v_{k,l}$ and the elevation difference $\Delta h_{k,l}$ previously input from the evaluation function optimizer 150, continues for a predetermined number of times.

When the termination condition is not satisfied, the recalculation unit 190 recalculates the displacement difference $\Delta v_{k,l}$ and the elevation difference $\Delta h_{k,l}$ of pixels k and l from the displacement velocity $v_k$ and the elevation $h_k$ calculated by the merging unit 170 (step S131). That is, for example, the recalculation unit 190 finds a difference between the displacement velocities $v_k$ and a difference between the elevations $h_k$ of two neighboring pixels to obtain the displacement velocity difference $\Delta v_{k,l}$ and the elevation difference $\Delta h_{k,l}$. The recalculation unit 190 gives the calculated displacement velocity difference $\Delta v_{k,l}$ and the elevation difference $\Delta h_{k,l}$ to the evaluation function optimization unit 150 as initial values (step S132). The evaluation function optimization unit 150 again executes the process of step S120.

In the fifth example embodiment, the possibility of obtaining the evaluation value that is the optimal solution increases and a higher reliable merging result can be obtained.

Example Embodiment 6

Figure 13:
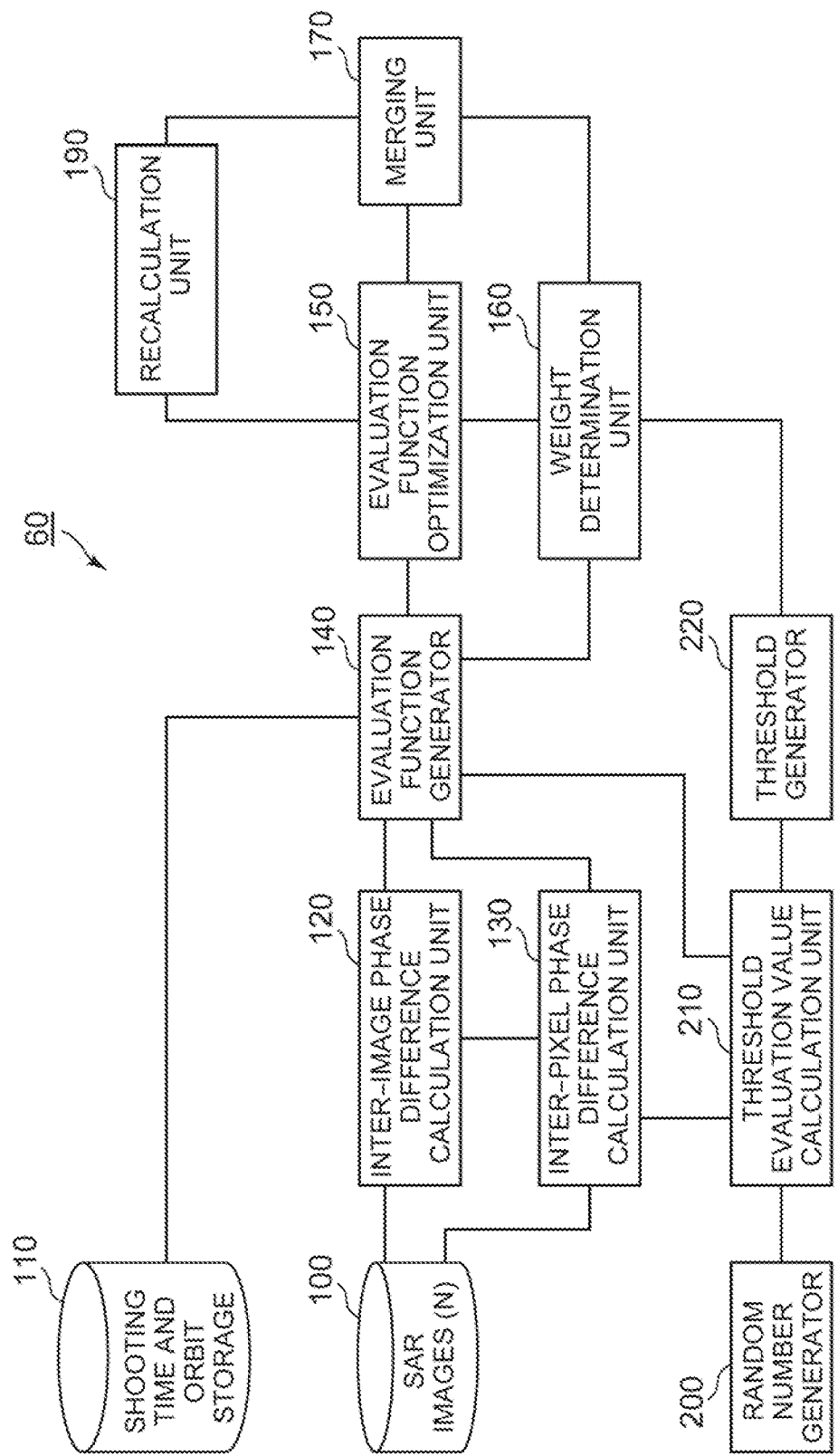
FIG. 13 It depicts a block diagram showing a configuration example of the image analyzing device of the sixth example embodiment.

FIG. 13 is a block diagram showing a configuration example of the image analyzing device of the sixth example embodiment. The image analyzing device 60 shown in FIG. 13 includes the SAR image storage 100, the shooting time and orbit storage 110, the inter-image phase difference calculation unit 120, the inter-pixel phase difference calculation unit 130, the evaluation function generator 140, the evaluation function optimization unit 150, the weight determination unit 160, the merging unit 170, a recalculation unit 190, the random number generator 200, the threshold evaluation value calculation unit 210, and the threshold generator 220.

The components other than the recalculation unit 190 are the same as the components in the second example embodiment shown in FIG. 4. However, the merging unit 170 performs the process in the second example embodiment and an added process. The recalculation unit 190 performs the same processing as it in the fifth example embodiment.

Figure 14:
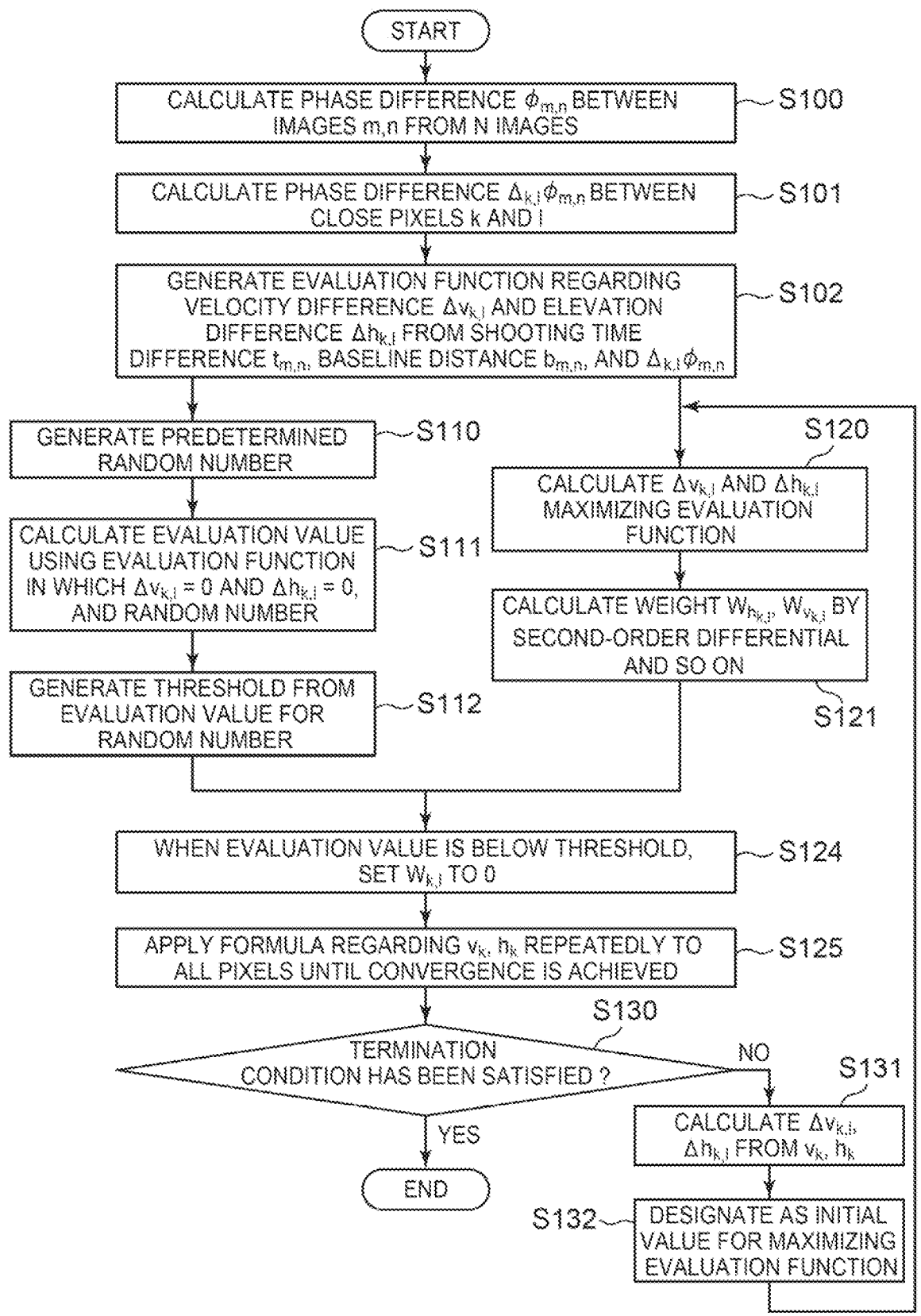
FIG. 14 It depicts a flowchart showing an example of an operation of the image analyzing device of the sixth example embodiment.

Next, the operation of the image analyzing device 60 will be described with reference to the flowchart of FIG. 14. The processes of steps S100-S125 are the same as the processes in the second example embodiment (refer to FIG. 5). The processes of steps S130-S132 are the same as the processes in the fifth example embodiment (refer to FIG. 12).

In the sixth example embodiment, as in the case of the fifth example embodiment, the possibility of obtaining the evaluation value that is the optimal solution increases and a higher reliable merging result can be obtained.

Example Embodiment 7

Figure 15:
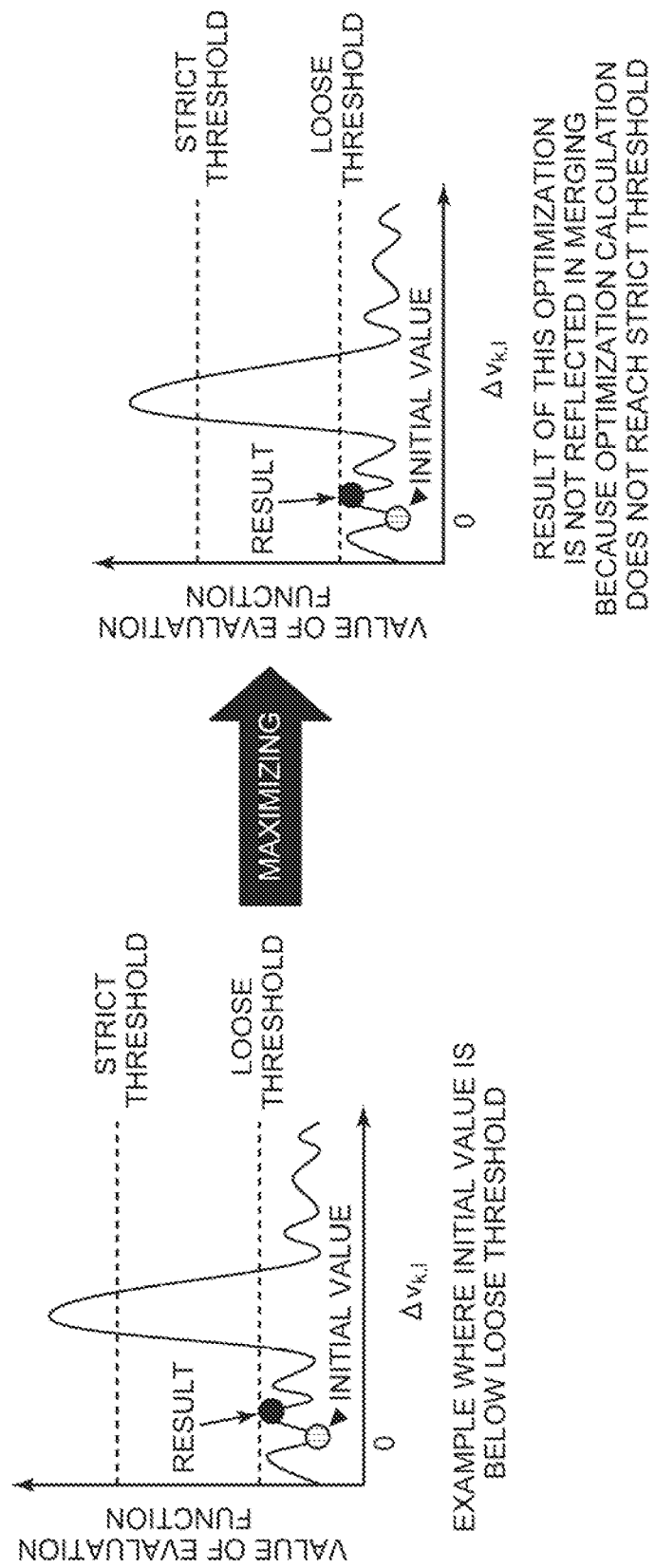
FIG. 15 It depicts an explanatory diagram for explaining the mechanism for reducing a calculation amount.

The process of optimization using an evaluation function is a process requiring a large calculation amount. In the seventh example embodiment and the eighth example embodiment, a mechanism to reduce a calculation amount is added. FIG. 15 is an explanatory diagram for explaining the mechanism for reducing a calculation amount. As shown in FIG. 15, a loose threshold is used. The loose threshold is smaller than the strict threshold. The loose threshold is determined based on an evaluation value calculated using random numbers and the evaluation function of equation (3), for example. As an example, when the average value×3 of the value of the evaluation function calculated by the threshold generator 220 using random numbers is set as the threshold, the loose threshold is determined to be the average value×2.

As shown in FIG. 15, when the evaluation value actually calculated using an evaluation function (for example, the evaluation function of equation (3)) using a certain initial value is less than the loose threshold, the process of optimization using the initial value is considered to have the possibility of not outputting the optimal value. When the calculated evaluation value is greater than or equal to the strict threshold, the process of optimization using the initial value is likely to output an optimal value.

Referring to FIG. 10, it is preferable that the process of optimization (recalculation of the evaluation function) is performed again with the displacement velocity difference $\Delta v_{k,l}$, as the initial value, recalculated from the merged displacement velocity $v_k$. However, even if the process of optimization is performed again with the displacement velocity difference $\Delta v_{k,l}$, as the initial value, corresponding to the evaluation value below the loose threshold, a value closer to the optimal value cannot be obtained. Therefore, it can be said that the process of optimization had not better be performed based on the displacement velocity difference $\Delta v_{k,l}$ corresponding to the evaluation value below the loose threshold. When the process of optimization is not performed, the displacement velocity difference $\Delta v_{k,l}$ corresponding to the evaluation value below the loose threshold will not be reflected to the merging result.

Figure 16:
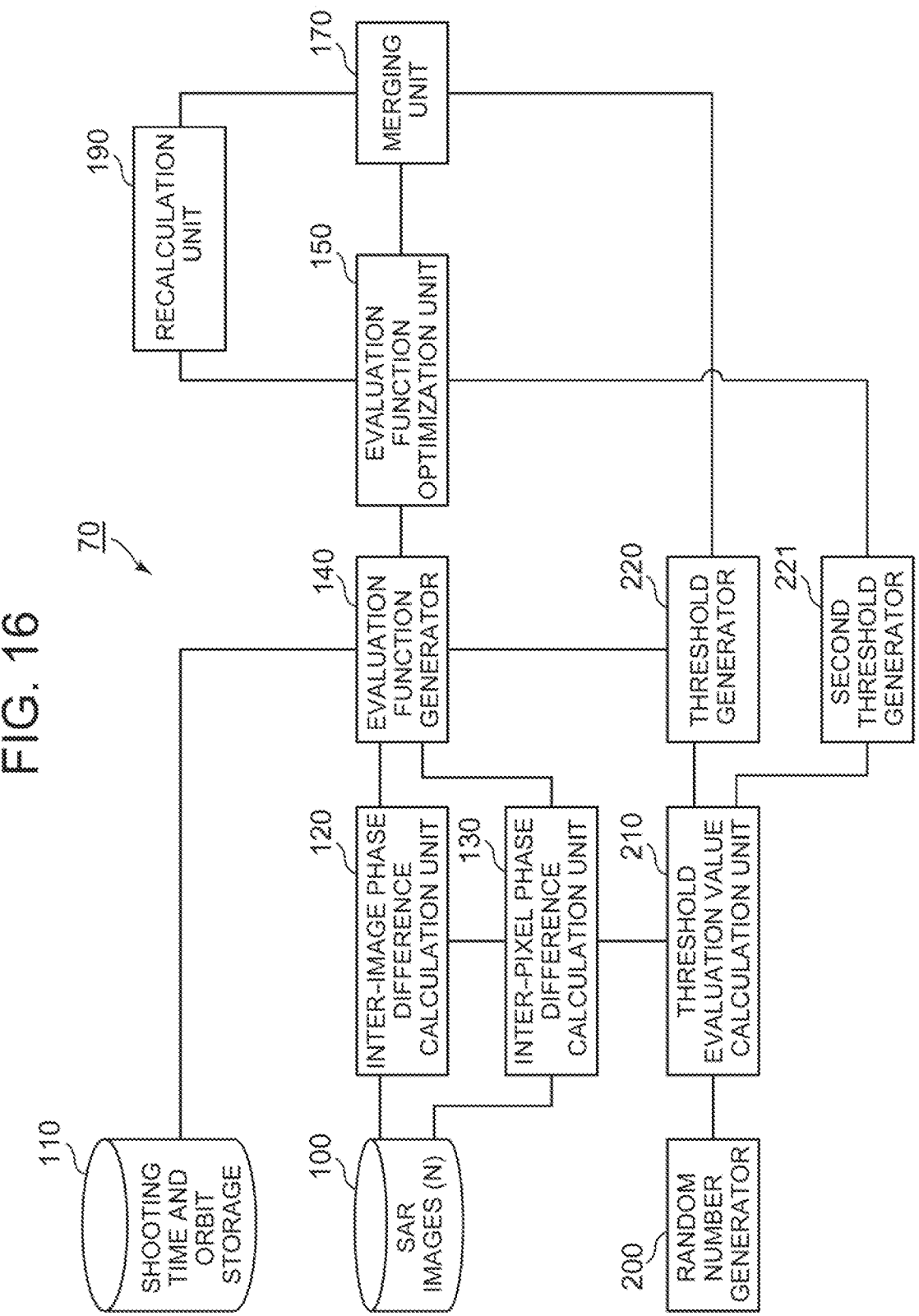
FIG. 16 It depicts a block diagram showing a configuration example of the image analyzing device of the seventh example embodiment.

FIG. 16 is a block diagram showing a configuration example of the image analyzing device of the seventh example embodiment. The image analyzing device 70 shown in FIG. 16 includes the SAR image storage 100, the shooting time and orbit storage 110, the inter-image phase difference calculation unit 120, the inter-pixel phase difference calculation unit 130, the evaluation function generator 140, the evaluation function optimization unit 150, the merging unit 170, the recalculation unit 190, the random number generator 200, the threshold evaluation value calculation unit 210, the threshold generator 220, and a second threshold generator 221.

The components other than the second threshold generator 221 are the same as the components in the fifth example embodiment shown in FIG. 11. However, the evaluation function optimization unit 150 performs the process in the fifth example embodiment and an added process.

Figure 17:
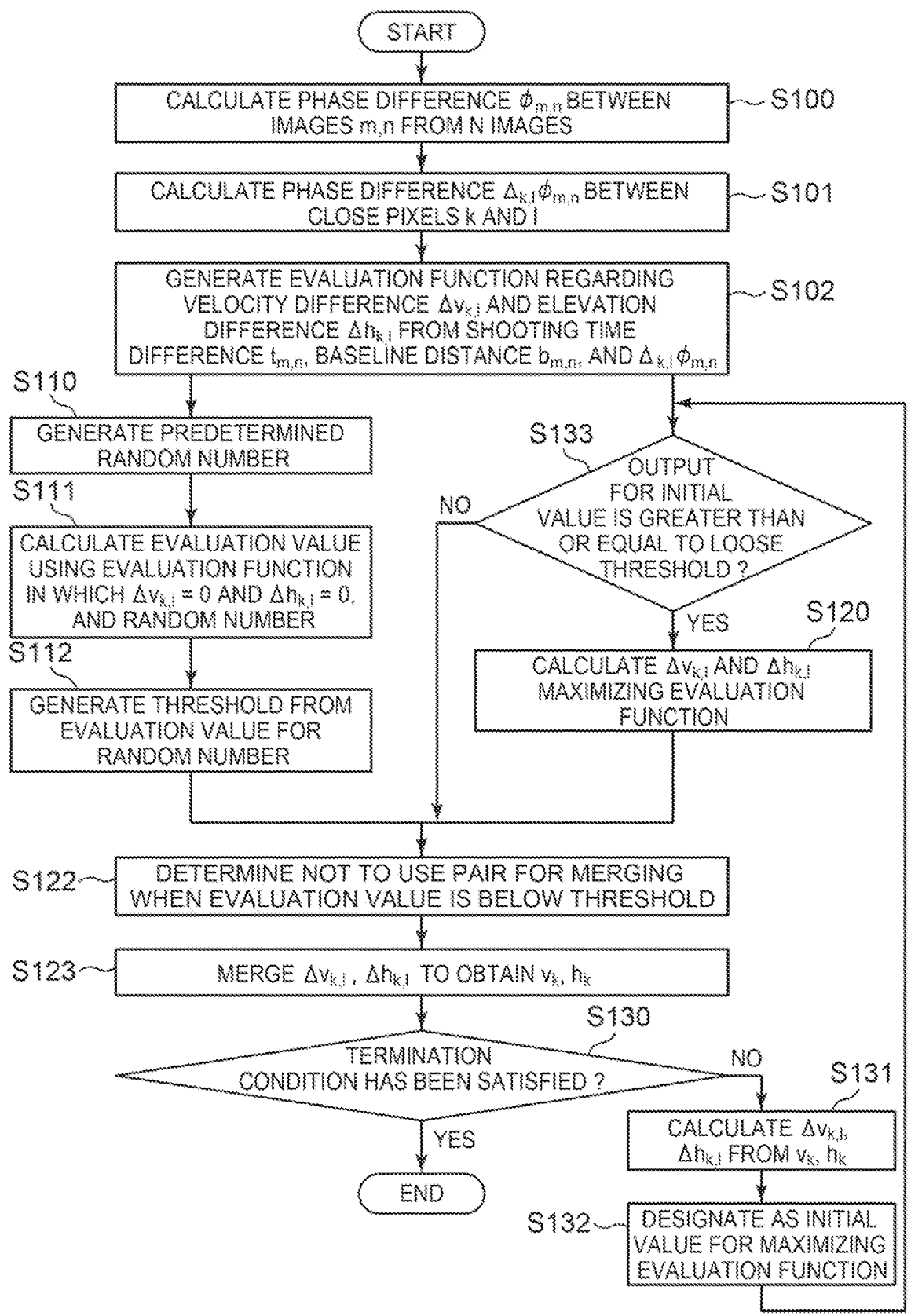
FIG. 17 It depicts a flowchart showing an example of an operation of the image analyzing device of the seventh example embodiment.

Next, the operation of the image analyzing device 70 will be described with reference to the flowchart of FIG. 17. The processes of steps S100-S132 are the same as the processes in the fifth example embodiment (refer to FIG. 12).

In the seventh example embodiment, the second threshold generator 221 generates the loose threshold described above. The threshold generated by the threshold generator 220 corresponds to the strict threshold described above.

After generating the evaluation function, the evaluation function optimization unit 150 checks whether the obtained evaluation value is greater than or equal to the loose threshold (step S133). When the evaluation value is greater than or equal to the loose threshold, the processes from step S120 onward are executed. That is, the process of optimization (step S120) and subsequent processes are executed.

When the obtained evaluation value is less than the loose threshold, the process of step S120 is not performed. In other words, the process of optimization is skipped.

In the seventh example embodiment, since the process of optimization is not performed in case there is a high possibility that the calculation to optimize (in this example embodiment, maximize) the evaluation function will not yield the optimal value (in this example embodiment, the maximum value), a calculation amount is reduced.

Example Embodiment 8

Figure 18:
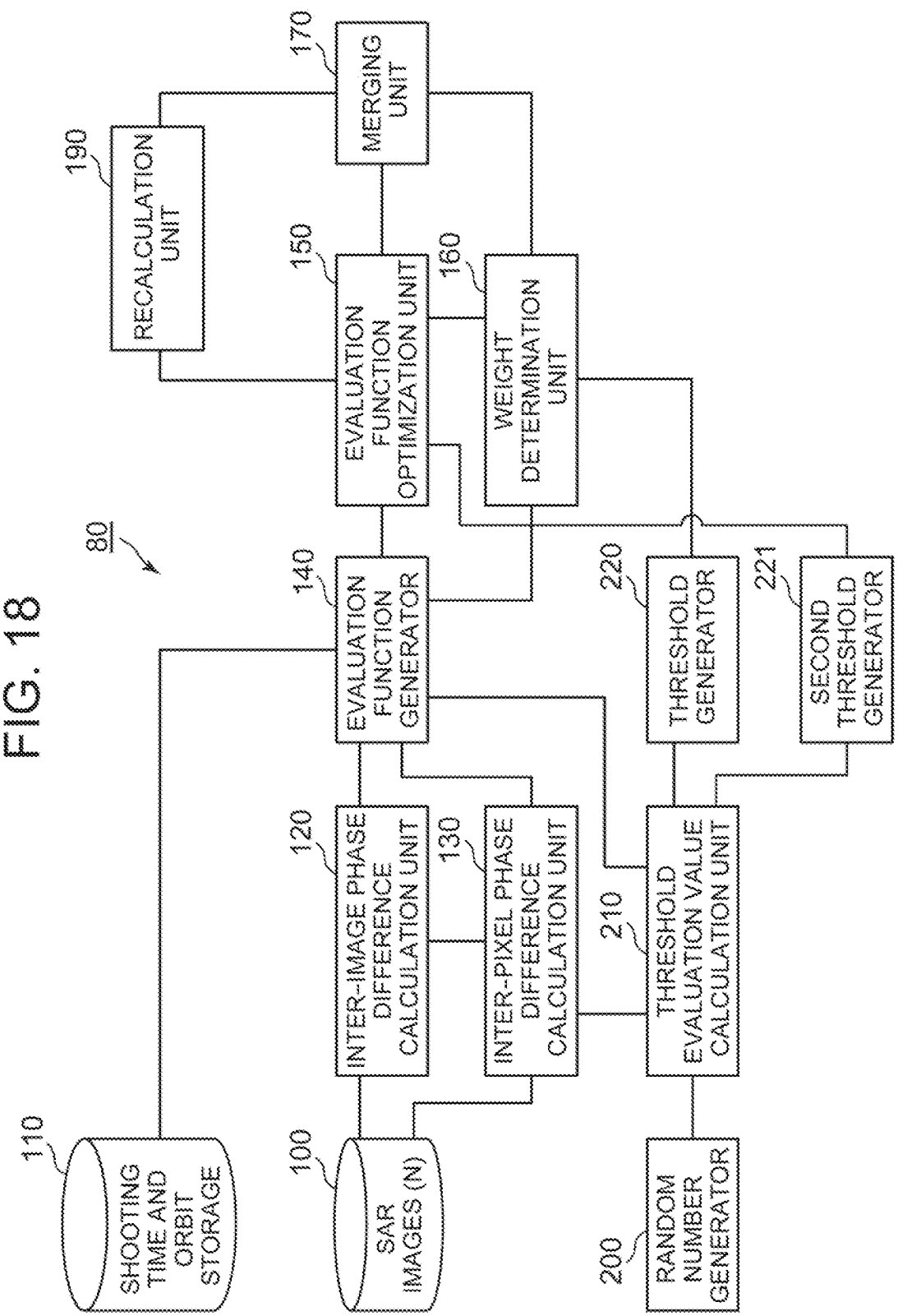
FIG. 18 It depicts a block diagram showing a configuration example of the image analyzing device of the eighth example embodiment.

FIG. 18 is a block diagram showing a configuration example of the image analyzing device of the eighth example embodiment of an image analyzing device. The image analyzing device 80 shown in FIG. 18 includes the SAR image storage 100, the shooting time and orbit storage 110, the inter-image phase difference calculation unit 120, the inter-pixel phase difference calculation unit 130, the evaluation function generator 140, the evaluation function optimization unit 150, the weight determination unit 160, the merging unit 170, the recalculation unit 190, the random number generator 200, the threshold evaluation value calculation unit 210, the threshold generator 220, and the second threshold generator 221.

The components other than the second threshold generator 221 are the same as the components in the sixth example embodiment shown in FIG. 13. However, the evaluation function optimization unit 150 performs the process in the sixth example embodiment and an added process.

Figure 19:
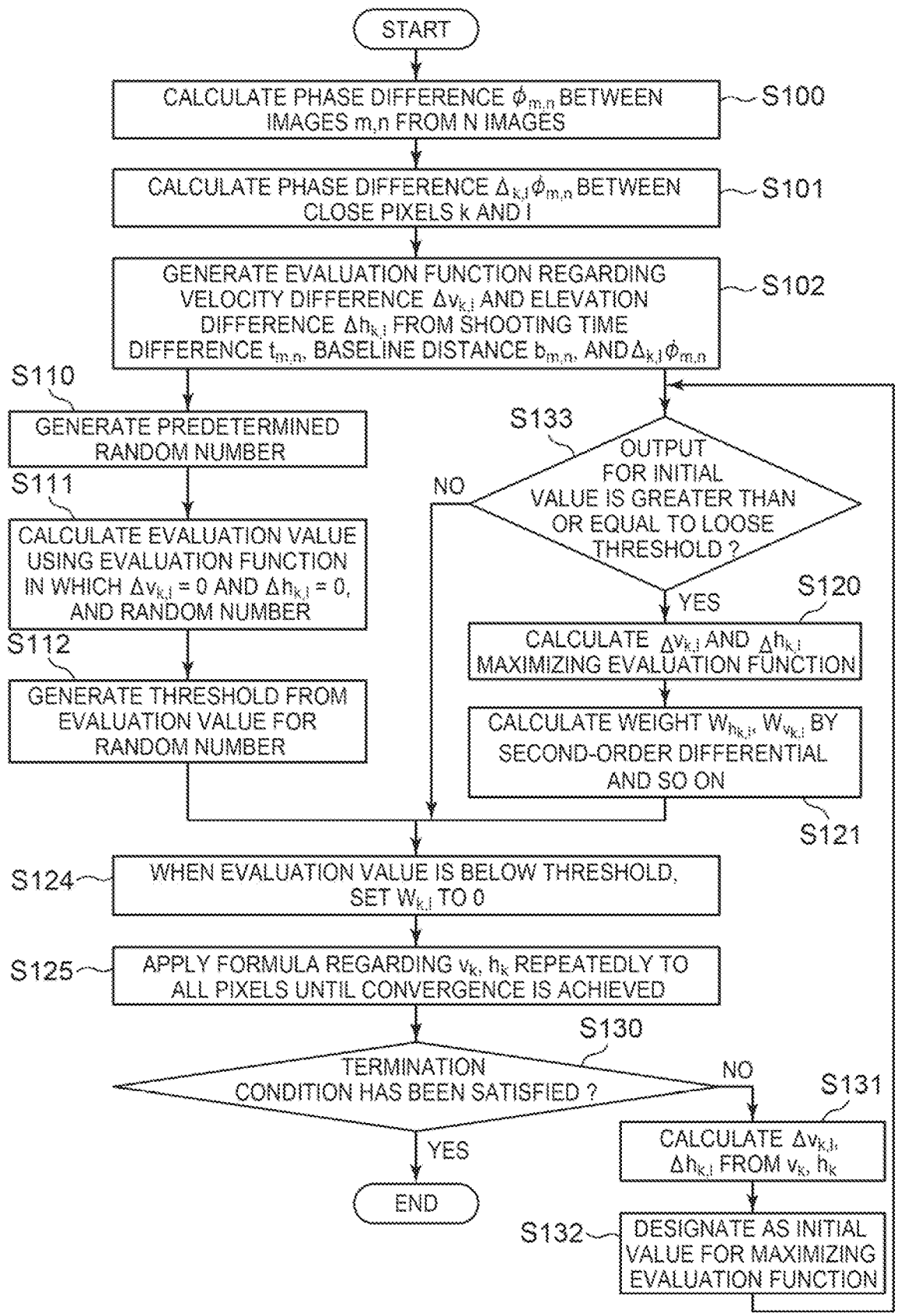
FIG. 19 It depicts a flowchart showing an example of an operation of the image analyzing device of the eighth example embodiment.

Next, the operation of the image analyzing device 80 will be described with reference to the flowchart of FIG. 19. The processes of steps S100-S132 are the same as the processes in the sixth example embodiment (refer to FIG. 14).

In the eighth example embodiment, the second threshold generator 221 generates the loose threshold. After generating the evaluation function, the evaluation function optimization unit 150 checks whether the obtained evaluation value is greater than or equal to the loose threshold (step S133). When the evaluation value is greater than or equal to the loose threshold, the processes from step S120 onward are executed. That is, the process of optimization (step S120) and subsequent processes are executed.

When the obtained evaluation value is less than the loose threshold, the process of step S120 is not performed. In other words, the process of optimization is skipped.

In the eighth example embodiment, as in the case of the seventh example embodiment, a calculation amount related to the process of optimization is reduced.

In each of the above example embodiments, the image analyzing devices are shown that handle both the displacement velocity $v_k$ and the elevation $h_k$. However, the image analyzing device may handle only the displacement velocity $v_k$ or only the elevation $h_k$.

When the image analyzing device handles only the displacement velocity $v_k$, an evaluation function is used in which the term regarding the elevation difference is deleted in the evaluation function illustrated as equation (1), for example. In addition, an evaluation function in which $b_{m,n}\Delta h_{k,l}$ is deleted in the evaluation function illustrated as equation (3) is used.

When the image analyzing device handles only the elevation $h_k$, an evaluation function is used in which the term regarding displacement is deleted in the evaluation function illustrated as equation (1), for example. In addition, an evaluation function in which $t_{m,n}\Delta v_{k,l}$ is deleted in the evaluation function illustrated as equation (3) is used.

In each of the above example embodiments, the analysis targets are a displacement difference (displacement velocity difference) and an elevation difference, however other elements can also be used as analysis targets. As an example, a thermal expansion coefficient of the observation target of synthetic aperture radar can be analyzed.

When using the above evaluation functions of equations (1) and (3) when analyzing a thermal expansion coefficient, the temperature difference at different observation points in time (temperature difference when each image comprising a pair is taken) is used instead of the shooting time difference $t_{m,n}$. In addition, instead of the displacement velocity difference $\Delta v_{k,l}$, the difference in thermal expansion coefficient between close pixels is used. For example, the thermal expansion coefficient can be obtained by using the evaluation functions of equations (1) and (3).

It is also possible to generate a device that combines the function of analyzing thermal expansion coefficient with the function of each of the above example embodiments of analyzing devices.

The image analyzing device and the image analyzing method of each of the above example embodiments can be suitably applied not only to an analysis of general displacement of structures on the ground surface or above ground, but also to an analysis of displacement based on underground construction and a ground subsidence analysis of a filled ground.

The functions (processes) in the above example embodiments may be realized by a computer having a processor such as a central processing unit (CPU), a memory, etc. For example, a program for performing the method (processing) in the above example embodiments may be stored in a storage device (storage medium), and the functions may be realized with the CPU executing the program stored in the storage device.

Figure 20:
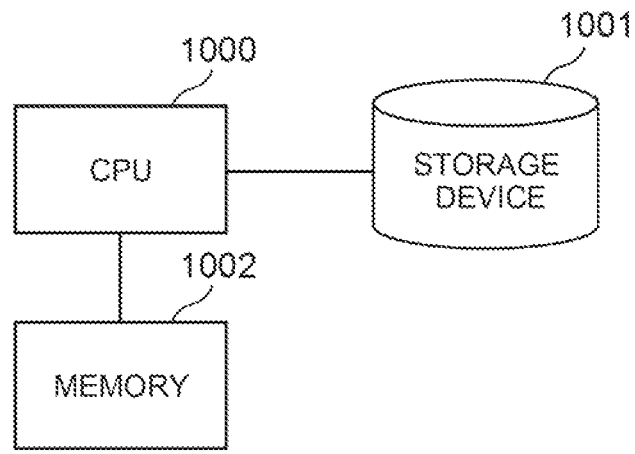
FIG. 20 It depicts a block diagram showing an example of a computer with a CPU.

FIG. 20 is a block diagram showing an example of a computer having a CPU. The computer is implemented in the data processing device. The CPU 1000 executes processing in accordance with an image analysis program (software component: codes) stored in a storage device 1001 to realize the functions in the above example embodiments. That is, the functions of the the inter-image phase difference calculation unit 120, the inter-pixel phase difference calculation unit 130, the evaluation function generator 140, the evaluation function optimization unit 150, the merging unit 170, the displacement and elevation evaluation function generator 180, the recalculation unit 190, the random number generator 200, the threshold evaluation value calculation unit 210, the threshold generator 220, and the second threshold generator 221 in the image analyzing devices shown in FIG. 2, FIG. 4, FIG. 6, FIG. 8, FIG. 11, FIG. 13, FIG. 16, FIG. 18.

The storage device 1001 is, for example, a non-transitory computer readable media. The non-transitory computer readable medium is one of various types of tangible storage media. Specific examples of the non-transitory computer readable media include a magnetic storage medium (for example, hard disk), a magneto-optical storage medium (for example, magneto-optical disk), a compact disc-read only memory (CD-ROM), a compact disc-recordable (CD-R), a compact disc-rewritable (CD-R/W), and a semiconductor memory (for example, a mask ROM, a PROM (programmable ROM), an EPROM (erasable PROM), a flash ROM). The memory device 1001 can also be used as the SAR image storage 100 and the shooting time and orbit storage 110.

The image analysis program may be stored in various types of transitory computer readable media. The transitory computer readable medium is supplied with the program through, for example, a wired or wireless communication channel, i.e., through electric signals, optical signals, or electromagnetic waves.

A memory 1002 is a storage means implemented by a RAM (Random Access Memory), for example, and temporarily stores data when the CPU 1000 executes processing. It can be assumed that a program held in the storage device 1001 or a temporary computer readable medium is transferred to the memory 1002 and the CPU 1000 executes processing based on the program in the memory 1002.

Figure 21:
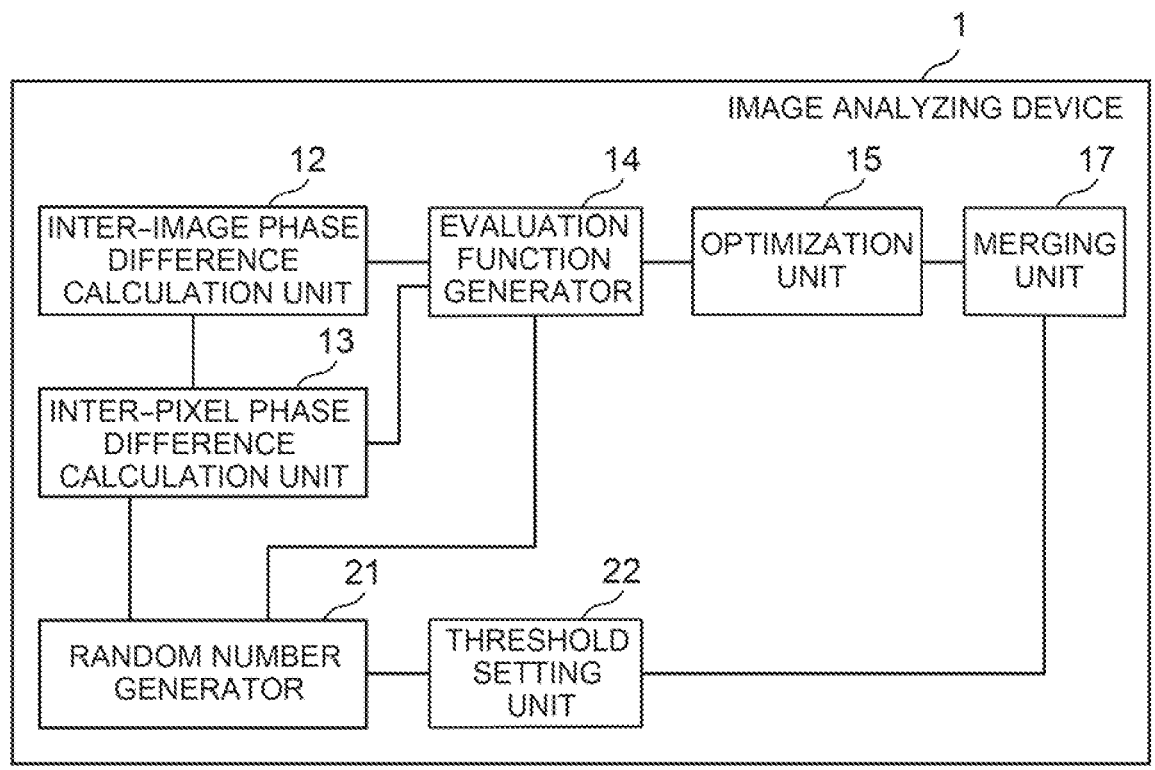
FIG. 21 It depicts a block diagram showing an overview of the image analyzing device.
Figure 22C:
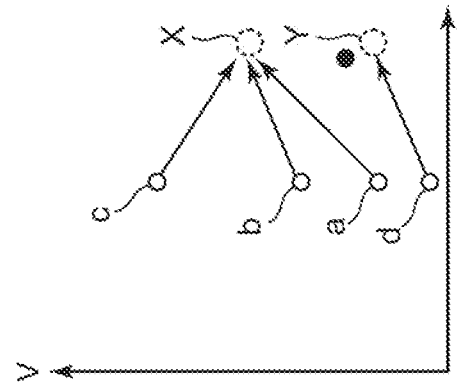
FIG. 22C It depicts an explanatory diagram showing an example of convergence to an incorrect value.
Figure 22B:
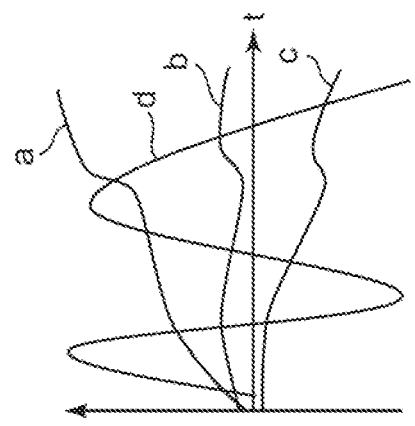
FIG. 22B It depicts an explanatory diagram showing an example of convergence to an incorrect value.
Figure 22A:
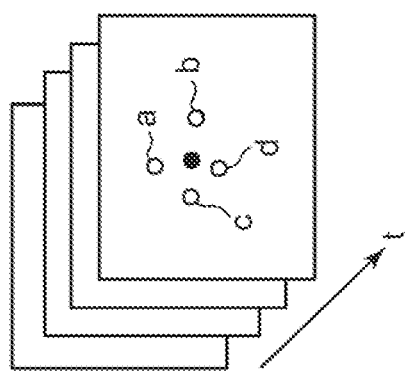
FIG. 22A It depicts an explanatory diagram showing an example of convergence to an incorrect value.

FIG. 21 is a block diagram showing the main part of the image analyzing device. The image analyzing device 1 shown in FIG. 21 comprises an inter-image phase difference calculation unit (inter-image phase difference calculation means) 12 (in the example embodiments, realized by the inter-image phase difference calculation unit 120) which calculates a phase difference image of a pair of images, an inter-pixel phase difference calculation unit (inter-pixel phase difference calculation means) 13 (in the example embodiments, realized by the inter-pixel phase difference calculation unit 130) which calculates a phase difference between close pixels in the phase difference image, an evaluation function generation unit (evaluation function generation means) 14 (in the example embodiments, realized by the evaluation function generator 140) which generates an evaluation function that includes at least the phase difference between pixels, an optimization unit (optimization means) 15 (in the example embodiments, realized by the evaluation function optimization unit 150) which optimizes the evaluation function for each pair of pixels or each pair of close pixels, a random number generation unit (random number generation means) 21 (in the example embodiments, realized by the random number generator 200) which generates a random number, a threshold setting unit (threshold setting means) 22 (in the example embodiments, realized by the threshold evaluation value calculation unit 210 and the threshold generator 220) which sets a threshold based on a result of evaluation of the random number using the evaluation function, and a merging unit 17 which obtains merged data (in the example embodiments, the displacement velocity $v_k$, the elevation $h_k$) of an entire image by merging values of variables (in the example embodiments, the displacement velocity difference $\Delta v_{k,t}$, the elevation difference $\Delta h_{k,t}$) when the optimization unit 15 performs optimization except for variables for which evaluation value using the evaluation function is less than the threshold.

A part of or all of the above example embodiments may also be described as, but not limited to, the following supplementary note.

(Supplementary note 1) An image analyzing device comprising:
  inter-image phase difference calculation means for calculating a phase difference image of a pair of images;
  inter-pixel phase difference calculation means for calculating a phase difference between close pixels in the phase difference image;
  evaluation function generation means for generating an evaluation function that includes at least the phase difference between pixels;
  optimization means for optimizing the evaluation function for each pair of pixels or each pair of close pixels;
  random number generation means for generating a random number;
  threshold setting means for setting a threshold based on a result of evaluation of the random number using the evaluation function; and
  merging means for obtaining merged data of an entire image by merging values of variables when the optimization means performs optimization except for variables for which evaluation value using the evaluation function is less than the threshold.

(Supplementary note 2) The image analyzing device according to Supplementary note 1, wherein
  the evaluation function generation means generates the evaluation function that includes a shooting time difference of the pair of images, and in which a difference in displacement velocity between close pixels is the variable, and
  the merging means merges differences in displacement velocity to obtain the displacement velocity of the pixel of the entire image.

(Supplementary note 3) The image analyzing device according to Supplementary note 1 or 2, wherein
  the evaluation function generation means generates the evaluation function that includes a baseline distance, and in which a difference in elevation between close pixels is the variable, and
  the merging means merges differences in elevation to obtain the elevation of the pixel of the entire image.

(Supplementary note 4) The image analyzing device according to any one of Supplementary notes 1 to 3, further comprising
  recalculation means for deriving a value of the variable from merged data obtained by the merging means, and sets derived value of the variable as an initial value when optimizing the evaluation function.

(Supplementary note 5) The image analyzing device according to Supplementary note 4, further comprising
  second threshold generation means for generating a second threshold that is smaller than the threshold, and
  determination means for determining whether or not there is a variable that makes the evaluation value using the evaluation function less than the second threshold,
  wherein the optimization means does not execute a process of optimization when the determination means determines there is the variable.

(Supplementary note 6) The image analyzing device according to any one of Supplementary notes 1 to 5, wherein
  the evaluation function generation means generates the evaluation function that includes a temperature difference, and in which a difference in thermal expansion coefficient between close pixels is the variable, and
  the merging means merges differences in thermal expansion coefficient to obtain the thermal expansion coefficient of the pixel of the entire image.

[Supplementary note 7) An image analyzing method comprising:
  calculating a phase difference image of a pair of images;
  calculating a phase difference between close pixels in the phase difference image;
  generating an evaluation function that includes at least the phase difference between pixels;
  optimizing the evaluation function for each pair of pixels or each pair of close pixels;
  generating a random number;
  setting a threshold based on a result of evaluation of the random number using the evaluation function; and
  obtaining merged data of an entire image by merging values of variables when the evaluation function is optimized except for variables for which evaluation value using the evaluation function is less than the threshold.

(Supplementary note 8) The image analyzing method according to Supplementary note 7, further comprising
  generating the evaluation function that includes a shooting time difference of the pair of images, and in which a difference in displacement velocity between close pixels is the variable, and
  merging differences in displacement velocity to obtain the displacement velocity of the pixel of the entire image.

(Supplementary note 9) The image analyzing method according to Supplementary note 7 or 8, further comprising
  generating the evaluation function that includes a baseline distance, and in which a difference in elevation between close pixels is the variable, and
  merging differences in elevation to obtain the elevation of the pixel of the entire image.

(Supplementary note 10) An image analyzing program causing a computer to execute
  the image analyzing program causes a computer to execute:
  a process of calculating a phase difference image of a pair of images;
  a process of calculating a phase difference between close pixels in the phase difference image;
  a process of generating an evaluation function that includes at least the phase difference between pixels;
  a process of optimizing the evaluation function for each pair of pixels or each pair of close pixels;
  a process of generating a random number;
  a process of setting a threshold based on a result of evaluation of the random number using the evaluation function; and
  a process of obtaining merged data of an entire image by merging values of variables when the evaluation function is optimized except for variables for which evaluation value using the evaluation function is less than the threshold.

(Supplementary note 11) The image analyzing program according to Supplementary note 10, causing the computer to further execute
the image analyzing program causes the computer to further execute
a process of generating the evaluation function that includes a shooting time difference of the pair of images, and in which a difference in displacement velocity between close pixels is the variable, and
a process of merging differences in displacement velocity to obtain the displacement velocity of the pixel of the entire image.

(Supplementary note 12) The image analyzing program according to Supplementary note 10 or 11, causing the computer to further execute
a process of generating the evaluation function that includes a baseline distance, and in which a difference in elevation between close pixels is the variable, and
a process of merging differences in elevation to obtain the elevation of the pixel of the entire image.

(Supplementary note 13) A computer readable recording medium storing an image analyzing program, wherein
the image analyzing program causes a computer to execute:
a process of calculating a phase difference image of a pair of images;
a process of calculating a phase difference between close pixels in the phase difference image;
a process of generating an evaluation function that includes at least the phase difference between pixels;
a process of optimizing the evaluation function for each pair of pixels or each pair of close pixels;
a process of generating a random number;
a process of setting a threshold based on a result of evaluation of the random number using the evaluation function; and
a process of obtaining merged data of an entire image by merging values of variables when the evaluation function is optimized except for variables for which evaluation value using the evaluation function is less than the threshold.

(Supplementary note 14) The recording medium according to Supplementary note 13, wherein
the image analyzing program causes the computer to further execute
a process of generating the evaluation function that includes a shooting time difference of the pair of images, and in which a difference in displacement velocity between close pixels is the variable, and
a process of merging differences in displacement velocity to obtain the displacement velocity of the pixel of the entire image.

(Supplementary note 15) The recording medium according to Supplementary note 13 or 14, wherein
the image analyzing program causes the computer to further execute
a process of generating the evaluation function that includes a baseline distance, and in which a difference in elevation between close pixels is the variable, and
a process of merging differences in elevation to obtain the elevation of the pixel of the entire image.

Although the invention of the present application has been described above with reference to example embodiments, the present invention is not limited to the above example embodiments. Various changes can be made to the configuration and details of the present invention that can be understood by those skilled in the art within the scope of the present invention.

REFERENCE SIGNS LIST

1 Image analyzing device
12 Inter-image phase difference calculation unit
13 Inter-pixel phase difference calculation unit
14 Evaluation function generator
15 Optimization unit
17 Merging unit
21 Random number generator
22 Threshold setting unit
10, 20, 30, 40, 50, 60, 70, 80 Image analyzing device
100 SAR image storage
110 Shooting time and orbit storage
120 Inter-image phase difference calculation unit
130 Inter-pixel phase difference calculation unit
140 Evaluation function generator
150 Evaluation function optimization unit
160 Weight determination unit
170 Merging unit
180 Displacement and elevation evaluation function generator
190 Recalculation unit
200 Random number generator
210 Threshold evaluation value calculation unit
220 Threshold generator
221 Second threshold generator
1000 CPU
1001 Storage device
1002 Memory

What is claimed is:

1. An image analyzing device comprising:
a memory storing software instructions, and
one or more processors configured to execute the software instructions to
calculate a phase difference image of a pair of images;
calculate a phase difference between close pixels in the phase difference image;
generate an evaluation function indicating a displacement velocity difference and an elevation difference based on the phase difference between pixels;
optimize the evaluation function for each pair of pixels or each pair of close pixels;
generate a random number;
set a threshold based on a result of evaluation of the random number using the evaluation function; and
obtain merged data of an entire image by merging values of variables corresponding to displacement velocity differences and elevation differences, when the evaluation function is optimized except for variables for which evaluation value using the evaluation function is less than the threshold.

2. The image analyzing device according to claim 1, wherein the one or more processors are configured to execute the software instructions to
generate the evaluation function that includes a shooting time difference of the pair of images, and
merge the displacement velocity differences to obtain displacement velocity of the entire image.

3. The image analyzing device according to claim 1, wherein the one or more processors are configured to execute the software instructions to generate the evaluation function that includes a baseline distance, and merge the elevation differences to obtain the elevation of the entire image.

4. The image analyzing device according to claim 1, wherein the one or more processors are configured to execute the software instructions to derive a value of a first variable, among the variables, from obtained merged data, and set a derived value of the variable as an initial value when optimizing the evaluation function.

5. The image analyzing device according to claim 4, wherein the one or more processors are configured to execute the software instructions to generate a second threshold that is smaller than the threshold, determine whether or not there is a second variable, among the variables, that makes the evaluation value using the evaluation function less than the second threshold, and not execute a process of optimization when determining there is the second variable.

6. The image analyzing device according to claim 1, wherein the one or more processors are configured to execute the software instructions to generate the evaluation function that includes a temperature difference, and in which a difference in thermal expansion coefficient between close pixels is an additional variable, and merge differences in the thermal expansion coefficient to obtain thermal expansion coefficient of the entire image.

7. An image analyzing method, implemented by a processor, comprising:

calculating a phase difference image of a pair of images;

calculating a phase difference between close pixels in the phase difference image;

generating an evaluation function indicating a displacement velocity difference and an elevation difference based on the phase difference between pixels;

optimizing the evaluation function for each pair of pixels or each pair of close pixels;

generating a random number;

setting a threshold based on a result of evaluation of the random number using the evaluation function; and obtaining merged data of an entire image by merging values of variables corresponding to displacement velocity differences and elevation differences, when the evaluation function is optimized except for variables for which evaluation value using the evaluation function is less than the threshold.

8. The image analyzing method, implemented by a processor, according to claim 7, further comprising generating the evaluation function that includes a shooting time difference of the pair of images, and merging the displacement velocity differences to obtain displacement velocity of the entire image.

9. The image analyzing method, implemented by a processor, according to claim 7, further comprising generating the evaluation function that includes a baseline distance, and merging differences in the elevation differences to obtain the elevation of the entire image.

10. A non-transitory computer readable recording medium storing an image analyzing program, wherein the image analyzing program causes a computer to execute:

a process of calculating a phase difference image of a pair of images;

a process of calculating a phase difference between close pixels in the phase difference image;

a process of generating an evaluation function indicating a displacement velocity difference and an elevation difference based on the phase difference between pixels;

a process of optimizing the evaluation function for each pair of pixels or each pair of close pixels;

a process of generating a random number;

a process of setting a threshold based on a result of evaluation of the random number using the evaluation function; and a process of obtaining merged data of an entire image by merging values of variables corresponding to displacement velocity differences and elevation differences, when the evaluation function is optimized except for variables for which evaluation value using the evaluation function is less than the threshold.

11. The non-transitory computer readable recording medium according to claim 10, wherein the image analyzing program causes the computer to further execute a process of generating the evaluation function that includes a shooting time difference of the pair of images, and a process of merging the displacement velocity differences to obtain displacement velocity of the entire image.

12. The non-transitory computer readable recording medium according to claim 10, wherein the image analyzing program causes the computer to further execute a process of generating the evaluation function that includes a baseline distance, and a process of merging the elevation differences to obtain the elevation of the entire image.

13. The image analyzing device according to claim 1, wherein the pair of images are captured by a flying object at different times.

* * * * *